(12) United States Patent
Allen et al.

(10) Patent No.: US 12,206,661 B2
(45) Date of Patent: *Jan. 21, 2025

(54) MULTI-PARTY EXCHANGE PLATFORM

(71) Applicant: Bank of America Corporation, Charlotte, NC (US)

(72) Inventors: Morgan S. Allen, Waxhaw, NC (US); Melissa Ortiz-Munoz, Springfield, VA (US); ChellaPrabhu Andrew Mariadoss, Irvine, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,739

(22) Filed: Oct. 11, 2023

(65) Prior Publication Data

US 2024/0039907 A1    Feb. 1, 2024

Related U.S. Application Data

(63) Continuation of application No. 17/380,540, filed on Jul. 20, 2021, now Pat. No. 11,818,117.

(51) Int. Cl.
*H04L 29/06* (2006.01)
*H04L 9/40* (2022.01)

(52) U.S. Cl.
CPC .......... *H04L 63/083* (2013.01); *H04L 63/062* (2013.01)

(58) Field of Classification Search
CPC .............. H04L 63/083; H04L 63/062; H04L 2463/102; G06Q 20/02; G06Q 20/06; G06Q 20/065

USPC ............................................. 726/4
See application file for complete search history.

(56) References Cited

U.S. PATENT DOCUMENTS

| 5,500,793 | A | 3/1996 | Deming, Jr. et al. |
| 7,089,208 | B1 | 8/2006 | Levchin et al. |
| 7,818,811 | B2 * | 10/2010 | Kirovski ............. G06Q 20/223 726/28 |
| 10,819,630 | B1 | 10/2020 | Panchal et al. |

(Continued)

OTHER PUBLICATIONS

Exchange of Preparatory Information for Secure and Usable Cryptocurrency Transactions, Kattwinkel et al, Dec. 2020 (Year: 2020).*

*Primary Examiner* — Jahangir Kabir
(74) *Attorney, Agent, or Firm* — Banner & Witcoff, Ltd.

(57) ABSTRACT

Arrangements for providing multi-party exchange functions are provided. In some aspects, a request for exchange may be received by a computing platform. The request for exchange may include identification of parties involved in the exchange, identification of goods, services, property, or the like, involved in the exchange, and the like. In some examples, the computing platform may determine a value of property, goods, or services associated with the exchange. The computing platform may request additional exchange data from one or more other parties. For instance, data associated with the exchange and another party to the exchange may be requested and received. In some examples, unique exchange identifiers may be generated linking each party to the exchange to the goods, services or property being exchange, a value, or the like. An indication of acceptance may be received and one or more exchange processing functions may be executed.

20 Claims, 18 Drawing Sheets

(56) References Cited

U.S. PATENT DOCUMENTS

| | | |
|---|---|---|
| 2009/0009023 A1 | 1/2009 | Weigold et al. |
| 2015/0161681 A1 | 6/2015 | Maes et al. |
| 2015/0227898 A1 | 8/2015 | Ballout |
| 2016/0055583 A1 | 2/2016 | Liberty et al. |
| 2017/0161807 A1 | 6/2017 | Aielli |
| 2018/0084404 A1 | 3/2018 | Gupta |
| 2019/0147435 A1* | 5/2019 | Mehrhoff ............... G06Q 30/06 705/39 |

* cited by examiner

MULTI-PARTY EXCHANGE PLATFORM

CROSS REFERENCE TO RELATED APPLICATIONS

This application is a continuation of and claims priority to co-pending U.S. application Ser. No. 17/380,540, filed Jul. 20, 2021, and entitled, "Multi-Party Exchange Platform," which is incorporated herein by reference in its entirety.

BACKGROUND

Aspects of the disclosure relate to electrical computers, systems, and devices for performing multi-party exchange functions.

Conventional purchase arrangements between two parties (e.g., a buyer and seller, buyer and merchant, or the like) often rely on traditional forms of payment (e.g., cash, credit card, debit card, or the like). In recent years, cryptocurrency has been gaining in popularity. However, many sellers or merchants might not be equipped to facilitate purchases or transfers of goods for cryptocurrency. Accordingly, systems for facilitating exchanges between parties using non-traditional forms of payment may be advantageous. These systems may be executed by a trusted third party that may be positioned to determine a value of goods, services, or the like, involved in the exchange and facilitate the exchange, exchange data tracking, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical difficulties associated with relying on non-traditional forms of payment in multi-party exchanges.

In some aspects, a request for exchange may be received by a computing platform. The request for exchange may include identification of parties involved in the exchange, identification of goods, services, property, or the like, involved in the exchange, and the like. In some examples, the computing platform may determine (e.g., based on data from one or more sources) a value of property, goods, or services associated with the exchange.

In some examples, the computing platform may request additional exchange data from one or more other parties. For instance, data associated with the exchange and another party to the exchange may be requested and received. In response to receiving data associated with the exchange, unique exchange identifiers may be generated linking each party to the exchange to the goods, services or property being exchange, a value, or the like.

The users who are parties to the exchange may accept to agree to the exchange and an indication of acceptance may be transmitted to the computing platform. The computing platform may modify the unique identifiers to reflect new ownership and may generate and execute one or more exchange processing functions to facilitate completion of the exchange (e.g., transfer funds, update account ledgers, and the like).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional purchase systems might not be conducive to using non-traditional payment methods to facilitate exchange of goods, services, and the like. Accordingly, arrangements described herein may include a system to facilitate exchanges between two or more parties that may, in some examples, rely on non-traditional forms of payment.

For instance, in some examples, first user may wish to make a purchase from a second user. The second user may be a merchant, private user, or the like. The first user may wish to use a non-traditional form of payment to make the purchase. Accordingly, the first user may initiate an exchange via a multi-party exchange computing platform. The first user may indicate the non-traditional form of payment being used and the multi-party exchange computing platform may determine a value associated with the non-traditional form of payment. Accordingly, the multi-party exchange computing platform may represent the value of the non-traditional form of payment on behalf of the first user. The second user may provide data related to property, goods or services being exchanged. In some examples, unique identifiers associated with each party may be generated. The unique identifiers may link each user to the property, goods or services being exchanged. Accordingly, on acceptance of the exchange, funds corresponding to the value of the non-traditional payment method may be transferred to the second user, and ownership of the property being purchased may be transferred to the first user. Accordingly, the first user may use the non-traditional payment method to make a purchase without first selling the goods associated with the non-traditional payment method.

These and various other arrangements will be discussed more fully below.

Figure 1A:
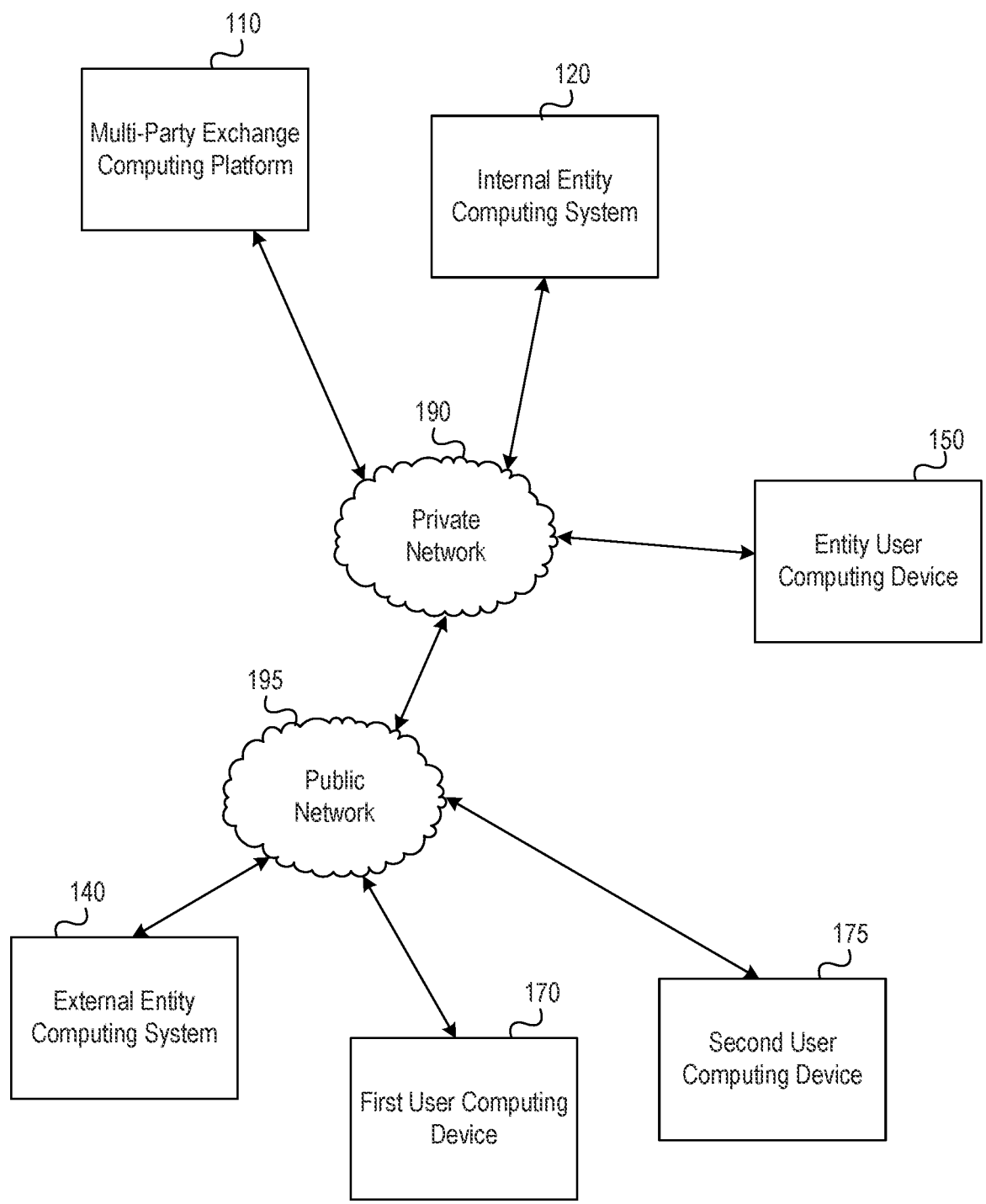
FIGS. 1A and 1B depict an illustrative computing environment for implementing multi-party exchange functions in accordance with one or more aspects described herein.
Figure 1B:
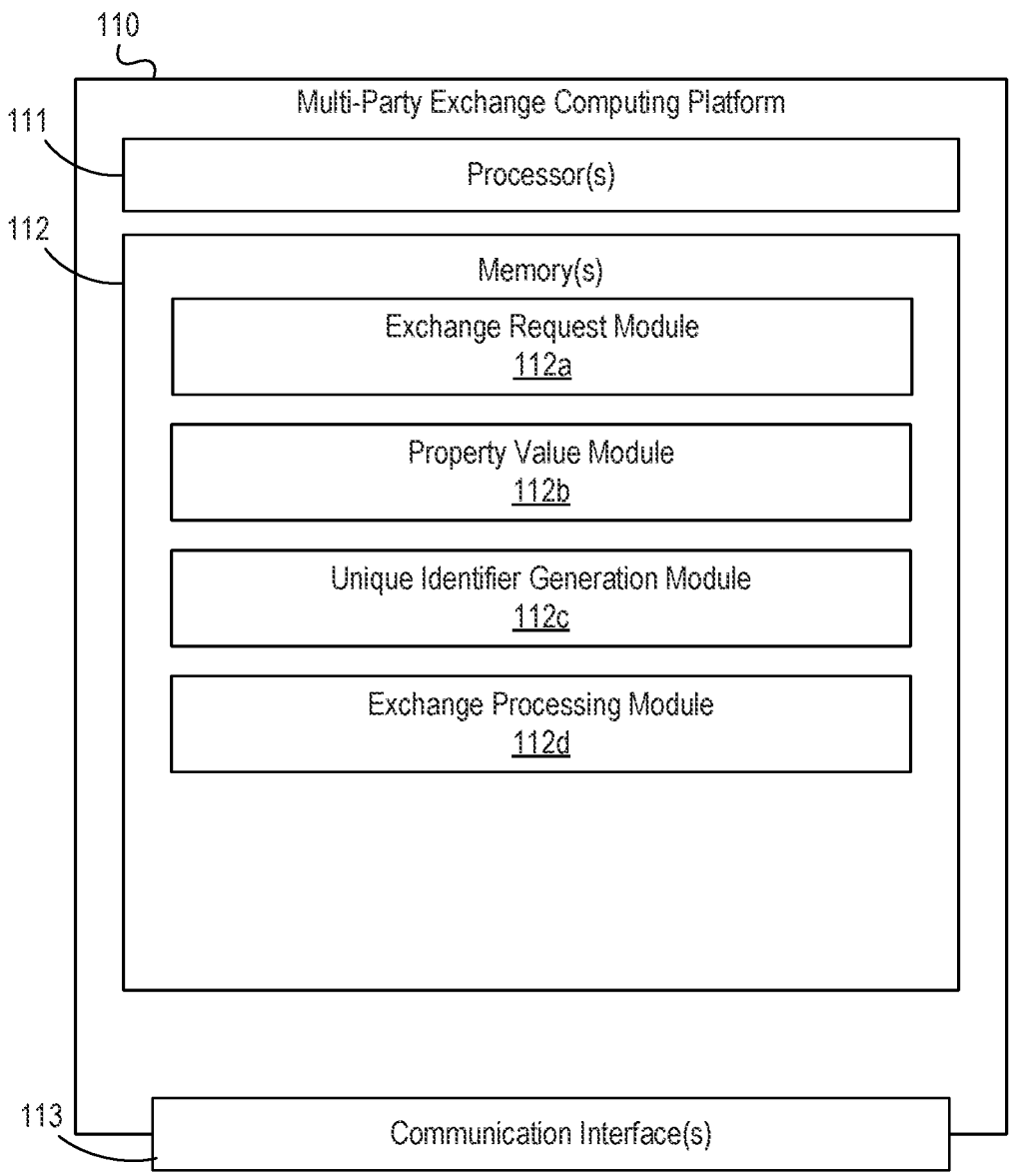

FIGS. 1A-1B depict an illustrative computing environment for implementing and using a multi-party exchange platform to dynamically control and process exchanges of goods, services or funds between two or more parties in accordance with one or more aspects described herein. Referring to FIG. 1A, computing environment 100 may include one or more computing devices and/or other computing systems. For example, computing environment 100 may include multi-party exchange computing platform 110, internal entity computing system 120, external entity computing system 140, first user computing device 170, and second user computing device 175. Although two user computing devices 170, 175 are shown in FIG. 1A, more than two user computing devices may be used without departing from the invention. For example, a three, four or more way exchange of property, goods or services may be controlled or executed by the multi-party exchange computing platform.

Multi-party exchange computing platform 110 may be configured to provide intelligent, dynamic exchange functions between two or more parties. For instance, multi-party exchange computing platform 110 may receive registration data from one or more users and/or user computing devices, such as first user computing device 170, second user computing device 175, and the like. In some examples, registration may include providing authentication data, user device data, account data, permission to retrieve data from other sources, and the like. In some examples, in response to receiving registration data, an application may be downloaded or otherwise provided to the user computing device (e.g., first user computing device 170, second user computing device 175, or the like). The application may execute on a respective user computing device and may be used to request an exchange, accept or approve an exchange with another party, receive unique identifiers, and the like.

The multi-party exchange computing platform 110 may receive a request to initiate an exchange. In some examples, an exchange may include an exchange of goods or services for other goods or services, an exchange of goods or services for funds, or the like. For instance, a first user may desire to purchase a vehicle from the second user. In exchange, the first user would like to provide other goods totally the cost of the vehicle (e.g., gold bars, vintage coins, cryptocurrency, or the like). Accordingly, to avoid the first user exchanging the goods for funds, the multi-party exchange platform may facilitate the exchange or sale based on value of all goods, agreement by the users/parties, and the like. The multi-party exchange platform may hold a value associated with the goods and provide that value in, for instance, cash or other funds, to the selling party upon completion of the exchange. The entity controlling the multi-party exchange platform 110 may then sell the goods for funds, may facilitate another exchange using the goods received, or the like.

After initiating the request for exchange, data may be extracted from the request. For instance, one or more other parties to the exchange may be identified, property being exchanged or used as payment may be identified, and the like. Based on this data, the multi-party exchange computing platform 110 may determine a value of the goods being exchanged. In some examples, this may be based, at least in part, on data retrieved from one or more other computing systems, such as internal entity computing system 120, external entity computing system 140, and the like.

The multi-party exchange computing platform 110 may generate a first unique exchange identifier. The first unique exchange identifying may include data linking or mapping the identifier to the first user, a value of the goods, and the like. The first unique exchange identifier may be transmitted to a user computing device of a first user, such as first user computing device 170.

The multi-party exchange computing platform 110 may request additional exchange data from a second user who is a party to the exchange. The request for additional exchange data may be transmitted to the second user computing device 175. In response, the user may provide data related to the item being exchanged, purchased or sold, an amount associated with the exchange, purchase or sale, and the like. The multi-party exchange computing platform 110 may generate a second unique exchange identifier linking the second user to the goods, and the like. The second unique exchange identifier may be transmitted to the second user computing device 175.

In order to complete the exchange, the users may transmit unique identifiers to the other user's computing device, may authenticate to the device or exchange, and the like. In response, a notification may be generated by the first user computing device 170 and/or second user computing device 175 indicating that the exchange has been completed and the notification may be transmitted to the multi-party exchange computing platform 110. In response, the multi-party exchange computing platform may modify the first unique exchange identifier and the second unique exchange identifier to reflect the new ownership and may transmit the first unique exchange identifier to the second user computing device 175 and the second unique exchange identifier to the first user computing device 170.

The multi-party exchange computing platform 110 may then process the exchange. For instance, one or more instructions causing transfer of funds may be generated and transmitted to a system, such as internal entity computing system 120, for execution.

Internal entity computing system 120 may be one or more computing devices, systems, or the like, associated with the entity or enterprise organization implementing the multi-party exchange computing platform 110. Internal entity computing system 120 may have or include one or more databases, host or execute one or more applications, and the like, associated with a business of the enterprise organization. In some examples, internal entity computing system 120 may store information related to value for a plurality of goods and/or services. Additionally or alternatively, internal entity computing system 120 may store user information, account information, and the like.

Entity user computing device 150 may be one or more computing devices associated with the enterprise organization. For instance, entity user computing device may be a computing device accessed by one or more users (e.g., employees of the enterprise organization) in the course of business and may be used to update or modify parameters or rules associated with the multi-party exchange computing platform 110, and the like.

External entity computing system 140 may be one or more computing devices, systems, or the like, external to the enterprise organization (e.g., not owned or controlled by the enterprise organization). In some examples, external entity computing system 140 may store or otherwise provide publicly available information, such as information related to value for various goods or services, cryptocurrency, precious metals, or the like. Accordingly, external entity computing system 140 may be configured to communicate with multi-party exchange computing platform 110 to provide information that may be used to determine a value of goods, services, or the like, associated with the exchange.

First user computing device 170 and/or second user computing device 175 may be computing devices associated with different users, such as a first user and a second user, respectively. In some examples, first user computing device 170 and/or second user computing device 175 may be a mobile device, smartphone, wearable device, laptop computing device, desktop computing device, or the like, that may be used to initiate and/or execute a desired exchange between two or more users. Although two user computing devices are shown in FIG. 1A, additional user computing devices may be used without departing from the invention.

Computing environment 100 also may include one or more computing platforms. For example, and as noted above, computing environment 100 may include multi-party exchange computing platform 110. As illustrated in greater detail below, multi-party exchange computing platform 110 may include one or more computing devices configured to perform one or more of the functions described herein. For example, multi-party exchange computing platform 110 may include one or more computers (e.g., laptop computers, desktop computers, servers, server blades, or the like).

As mentioned above, computing environment 100 also may include one or more networks, which may interconnect one or more of multi-party exchange computing platform 110, internal entity computing system 120, entity user computing device 150, external entity computing system 140, first user computing device 170, and/or second user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, multi-party exchange computing platform 110, internal entity computing system 120, and entity user computing device 150, may be associated with an enterprise organization (e.g., a financial institution), and private network 190 may be associated with and/or operated by the organization, and may include one or more networks (e.g., LANs, WANs, virtual private networks (VPNs), or the like) that interconnect multi-party exchange computing platform 110, internal entity computing system 120, entity user computing device 150, and one or more other computing devices and/or computer systems that are used by, operated by, and/or otherwise associated with the organization. Public network 195 may connect private network 190 and/or one or more computing devices connected thereto (e.g., multi-party exchange computing platform 110, internal entity computing system 120, entity user computing device 150) with one or more networks and/or computing devices that are not associated with the organization. For example, external entity computing system 140, first user computing device 170 and/or second user computing device 175, might not be associated with an organization that operates private network 190 (e.g., because external entity computing system 140, first user computing device 170 and/or first user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, first user computing device 170 and/or second user computing device 175 to private network 190 and/or one or more computing devices connected thereto (e.g., multi-party exchange computing platform 110, internal entity computing system 120, entity user computing device 150).

Referring to FIG. 1B, multi-party exchange computing platform 110 may include one or more processors 111, memory 112, and communication interface 113. A data bus may interconnect processor(s) 111, memory 112, and communication interface 113. Communication interface 113 may be a network interface configured to support communication between multi-party exchange computing platform 110 and one or more networks (e.g., private network 190, public network, or the like). Memory 112 may include one or more program modules having instructions that when executed by processor(s) 111 cause multi-party exchange computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of multi-party exchange computing platform 110 and/or by different computing devices that may form and/or otherwise make up multi-party exchange computing platform 110.

For example, memory 112 may have, store and/or include exchange request module 112a. Exchange request module 112a may store instructions and/or data that may cause or enable the multi-party exchange computing platform 110 to receive a request for a multi-party exchange, initiate or activate multi-party exchange functions, generate requests for additional exchange data from one or more parties, and the like.

Multi-party exchange computing platform 110 may further have, store and/or include property value module 112b. Property value module 112b may store instructions and/or data that may cause or enable the multi-party exchange computing platform 110 to establish a communication session with one or more internal or external computing systems, request and receive data from the one or more internal or external computing systems, determine a value associated with property, goods, services, currently, precious metals, or the like, being used in the exchange, and the like. In some examples, property value module 112b may retrieve publicly available data such as a current price of an ounce of gold or silver, a current value of cryptocurrency, or the like, to determine a value associated with the goods, services, or the like, being exchanged.

Multi-party exchange computing platform 110 may further have, store and/or include unique identifier generation module 112c. Unique identifier generation module 112c may store instructions and/or data that may cause or enable the multi-party exchange computing platform 110 to generate one or more unique identifiers for each party to an exchange, transmit the unique identifiers to user computing devices, modify the unique identifiers based on execution of an exchange, and the like.

Multi-party exchange computing platform 110 may further have, store and/or include exchange processing module 112d. Exchange processing module 112d may store instructions and/or data that may cause or enable the multi-party exchange computing platform 110 to complete processing of an exchange. For instance, upon receiving a notification that all parties have agreed to execute the exchange, an amount of funds corresponding to a value of goods or services provided as part of the exchange may be transmitted to a party. Additionally or alternatively, ownership of the goods or services provided for the amount of funds may be transmitted to the entity or enterprise organization operating the multi-party exchange computing platform 110. In some examples, the goods or services may be held in anticipation of another party purchasing those goods or services (e.g., initiation of a second exchange). In other examples, the goods or services may be sold.

FIGS. 2A-2J depict one example illustrative event sequence for executing multi-party exchange functions in accordance with one or more aspects described herein. The events shown in the illustrative event sequence are merely one example sequence and additional events may be added, or events may be omitted, without departing from the invention. Further, one or more processes discussed with respect to FIGS. 2A-2J may be performed in real-time or near real-time.

Figure 2A:
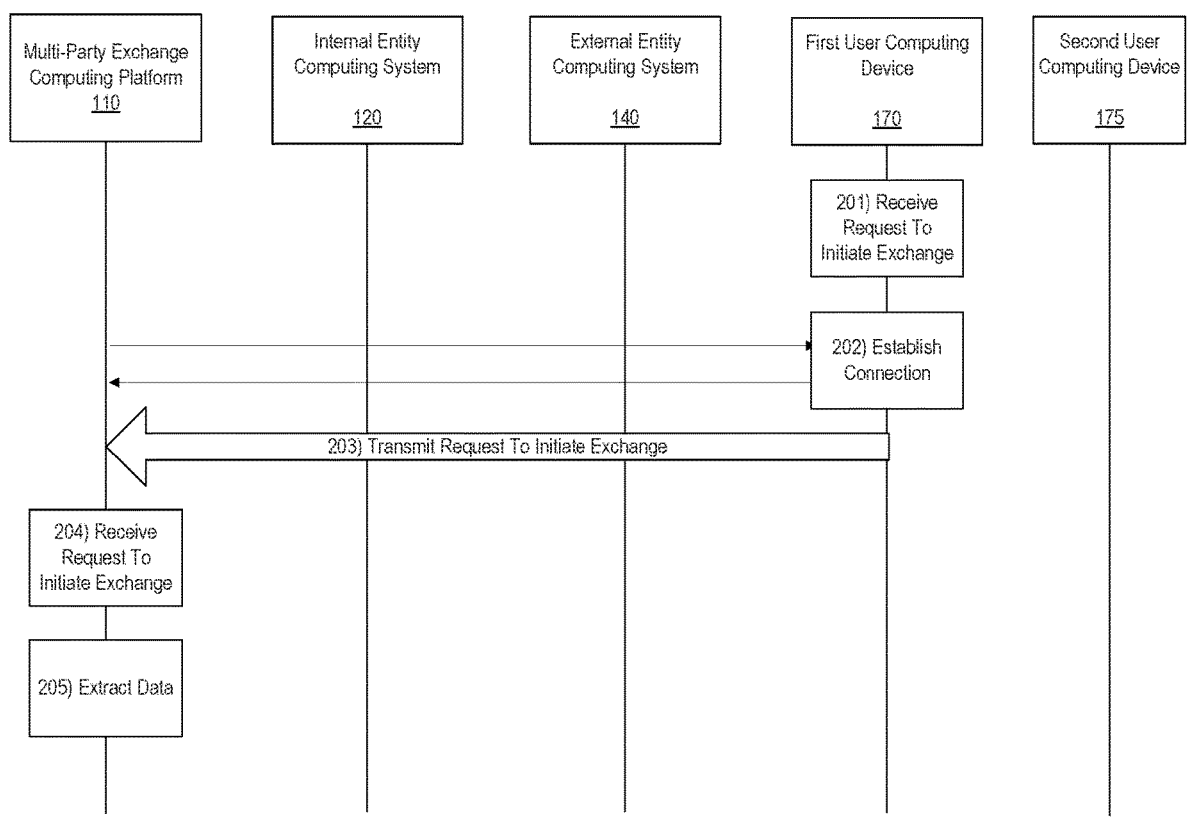
FIGS. 2A-2J depict an illustrative event sequence for implementing multi-party exchange functions in accordance with one or more aspects described herein.

Referring to FIG. 2A, at step 201, a user computing device may receive a request to initiate an exchange. For instance, a first user may provide user input to a first user computing device 170 requesting an exchange. In some examples, the exchange may include an exchange of property, goods, services, or the like, for other property, goods, services, or the like. In some examples, the exchange may include a purchase of goods or services using non-traditional payment (e.g., cryptocurrency, precious metals, performance of a service, or the like). The request to initiate an exchange may include details of the exchange (e.g., goods, services or the like being exchanged, parties to the exchange, and the like), user information associated with the first user (e.g., authentication data, user device data, account data, or the like), and the like. In some examples, the first user may, prior to requesting initiation of an exchange, register with the multi-party exchange computing platform 110 and may provide information during registration, such as identifying information, account information, authentication data, and the like. In some examples, one or more parties to the exchange may be pre-registered with the multi-party exchange computing platform 110.

At step 202, a connection may be established between the first user computing device 170 and the multi-party exchange computing platform 110. For instance, a first wireless connection may be established between the first user computing device 170 and multi-party exchange computing platform 110. Upon establishing the first wireless connection, a communication session may be initiated between multi-party exchange computing platform 110 and first user computing device 170.

At step 203, the request to initiate an exchange may be transmitted from the first user computing device 170 to the multi-party exchange computing platform 110. For instance, the request to initiate the exchange may be transmitted during the communication session initiated upon establishing the first wireless connection.

At step 204, the multi-party exchange computing platform 110 may receive the request to initiate the exchange and, in response, may activate, initiate or enable one or more multi-party exchange functions.

At step 205, data may be extracted from the request to initiate the exchange. For instance, data such as other parties to the exchange, goods, services or the like associated with the exchange, and the like, may be extracted from the request.

Figure 2B:
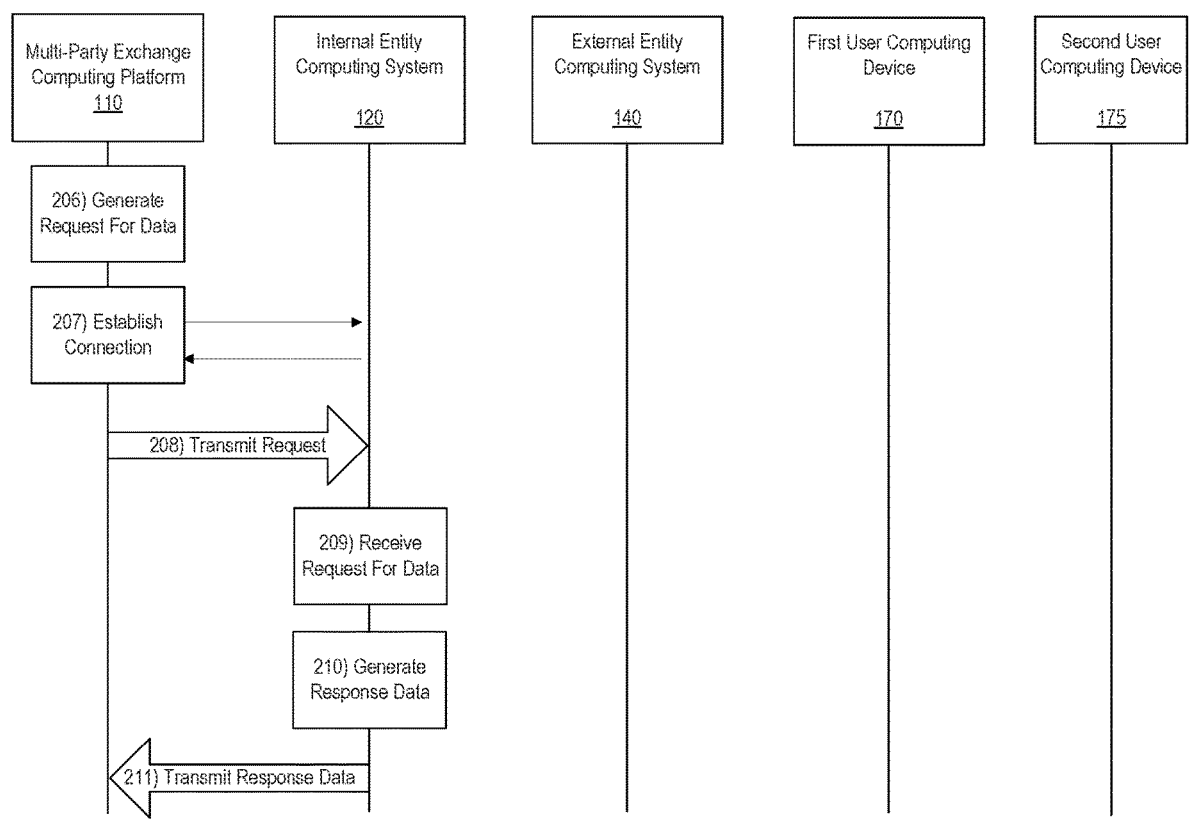

With reference to FIG. 2B, at step 206, the multi-party exchange computing platform 110 may generate a first request for data. The first request for data may include data requested from an internal system, such as internal entity computing system 120, and may include information associated with the user, internal data related to valuation of property, goods or services, and the like.

At step 207, a connection may be established between the multi-party exchange computing platform 110 and the internal entity computing system 120. For instance, a second wireless connection may be established between the multi-party exchange computing platform 110 and internal entity computing system 120. Upon establishing the second wireless connection, a communication session may be initiated between multi-party exchange computing platform 110 and internal entity computing system 120.

At step 208, the request for data may be transmitted by the multi-party exchange computing platform 110 to the internal entity computing system 120. For instance, the request for data may be transmitted during the communication session initiated upon establishing the second wireless connection.

At step 209, the internal entity computing system 120 may receive the request for data and may retrieve the requested data. The retrieved requested data may be used to generate response data at step 210. At step 211, the internal entity computing system 120 may transmit the response data to the multi-party exchange computing platform 110.

Figure 2C:
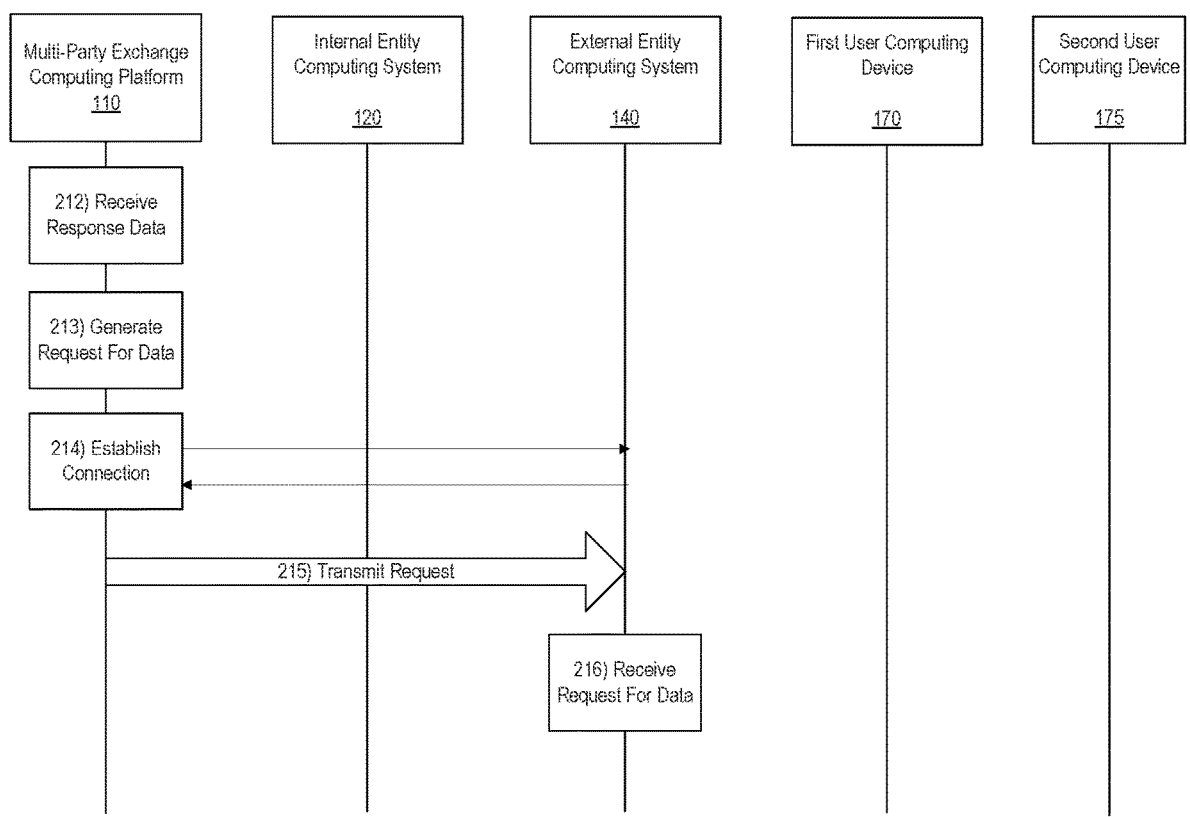
Figure 2D:
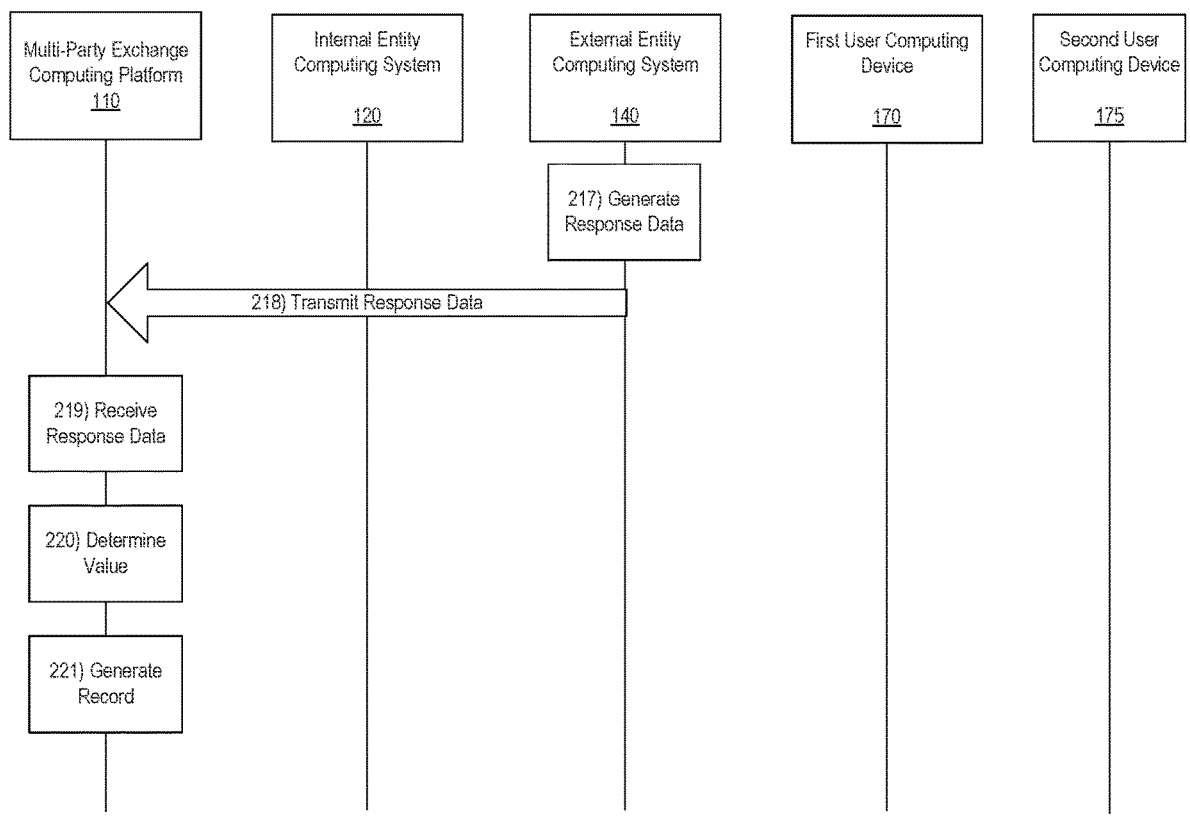

With reference to FIG. 2C, at step 212, the multi-party exchange computing platform 110 may receive the response data transmitted by the internal entity computing system 120.

At step 213, the multi-party exchange computing platform 110 may generate a second request for data. The second request for data may include data requested from an external system, such as external entity computing system 140, and may include information associated with the valuation of property, goods or services, current pricing for various goods, services or property, current value of cryptocurrency, and the like.

At step 214, a connection may be established between the multi-party exchange computing platform 110 and the external entity computing system 140. For instance, a third wireless connection may be established between the multi-party exchange computing platform 110 and external entity computing system 140. Upon establishing the third wireless connection, a communication session may be initiated between multi-party exchange computing platform 110 and external entity computing system 140.

At step 215, the second request for data may be transmitted by the multi-party exchange computing platform 110 to the external entity computing system 140. For instance, the second request for data may be transmitted during the communication session initiated upon establishing the third wireless connection.

At step 216, the external entity computing system 140 may receive the second request for data and may retrieve the requested data. The retrieved requested data may be used to generate second response data at step 217 in FIG. 2D.

At step 218, the external entity computing system 140 may transmit the second response data to the multi-party exchange computing platform 110.

At step 219, the multi-party exchange computing platform 110 may receive the second response data transmitted by the external entity computing system 140.

At step 220, a value associated with goods, services, property, or the like, being used in the exchange may be determined. For instance, the response data and second response data may be analyzed to determine a current value of the goods, services, or the like, being used in the exchange (e.g., to make a purchase). In some examples, the multi-party exchange computing platform 110 may determine whether the value of the goods, services, or the like, is sufficient for the exchange (e.g., whether the value corresponds to am amount associated with the purchase or other goods, services, and the like, being exchanged). The multi-party exchange computing platform 110 may represent (e.g., via the system) that an amount of funds equal to the determined value is being held for the first user. Accordingly, other parties to the exchange may be aware that currency or traditional funds are available for use by the first user in the exchange.

At step 221, a record may be generated. For instance, a record of the requested exchange, goods, services, and the like involved, determined value, date and time of the determined value, and the like, may be generated and stored in a database.

Figure 2E:
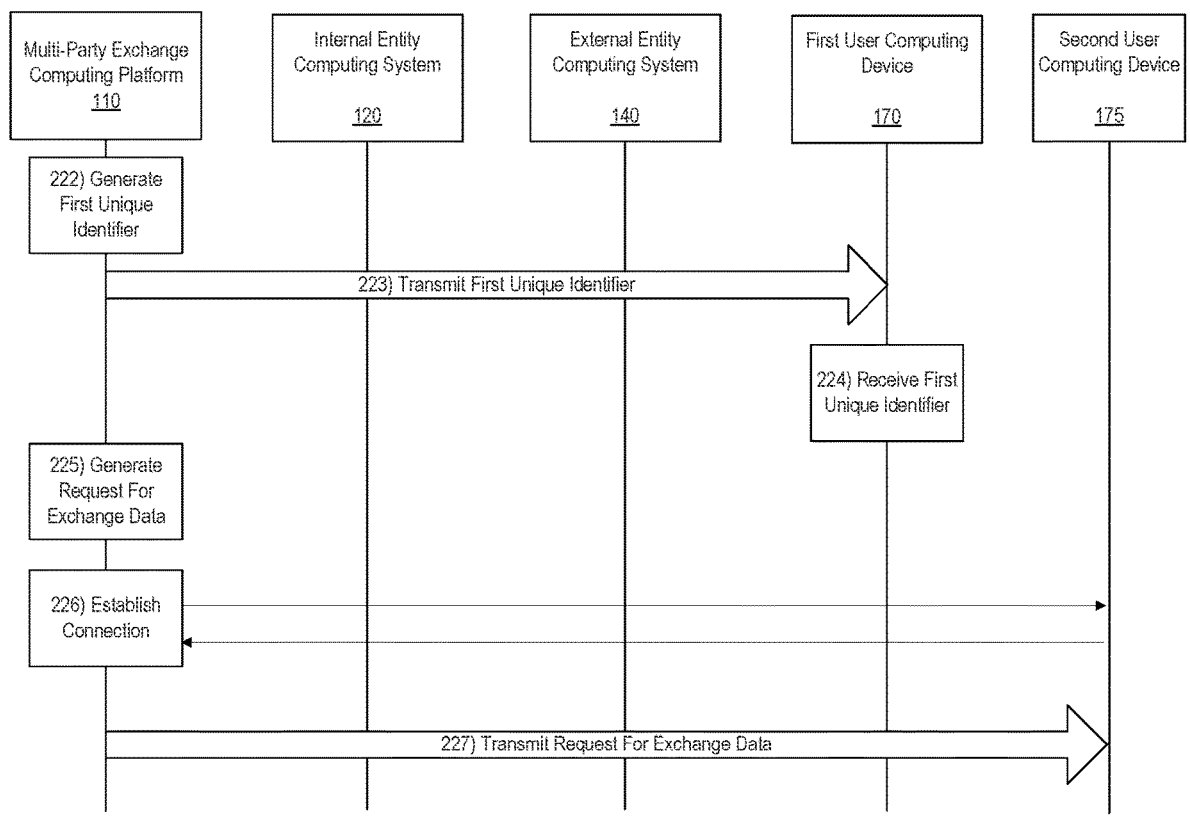

With reference to FIG. 2E, at step 222, the multi-party exchange computing platform 110 may generate a first unique exchange identifier. The first unique exchange identifier may include data linking a user to the property, goods, or services, a value associated with the property, goods, or services, and the like. In some examples, the first unique exchange identifier may be stored by the multi-party exchange computing platform 110 (e.g., via the record generated at step 221).

At step 223, the first unique exchange identifier may be transmitted from the multi-party exchange computing platform 110 to the first user computing device 170. At step 224, the first user computing device 170 may receive the first unique exchange identifier and may store the first unique exchange identifier.

Figure 4:
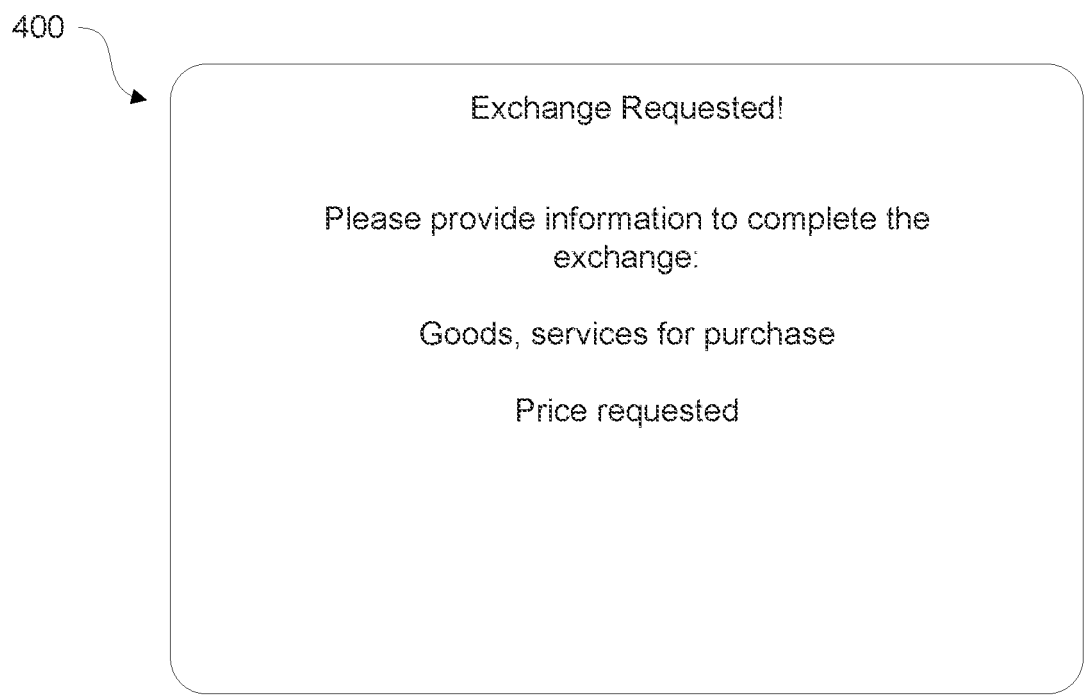
FIGS. 4-6 illustrate example user interfaces that may be generated in accordance with one or more aspects described herein.

At step 225, the multi-party exchange computing platform 110 may generate a request for exchange data. For instance, a request for additional data related to the exchange may be generated. In some examples, the additional data may include data related to a second party, property, goods or services associated with the second party and part of the exchange, a requested price associated with the property, goods, or services, and the like. FIG. 4 illustrates one example user interface 400 that may be generated. The interface 400 includes a request for additional data such as the goods or services being exchanged and a price associated with the goods or services.

At step 226, a connection may be established between the multi-party exchange computing platform 110 and the second user computing device 175. For instance, a fourth wireless connection may be established between the multi-party exchange computing platform 110 and second user computing device 175. Upon establishing the fourth wireless connection, a communication session may be initiated between multi-party exchange computing platform 110 and second user computing device 175.

At step 227, the request for additional exchange data may be transmitted by the multi-party exchange computing platform 110 to the second user computing device 175. For instance, the request for additional exchange data may be transmitted during the communication session initiated upon establishing the fourth wireless connection. In some examples, the interface 400 in FIG. 4 may be transmitted to the second user computing device 175 and displayed on a display of the second user computing device 175.

Figure 2F:
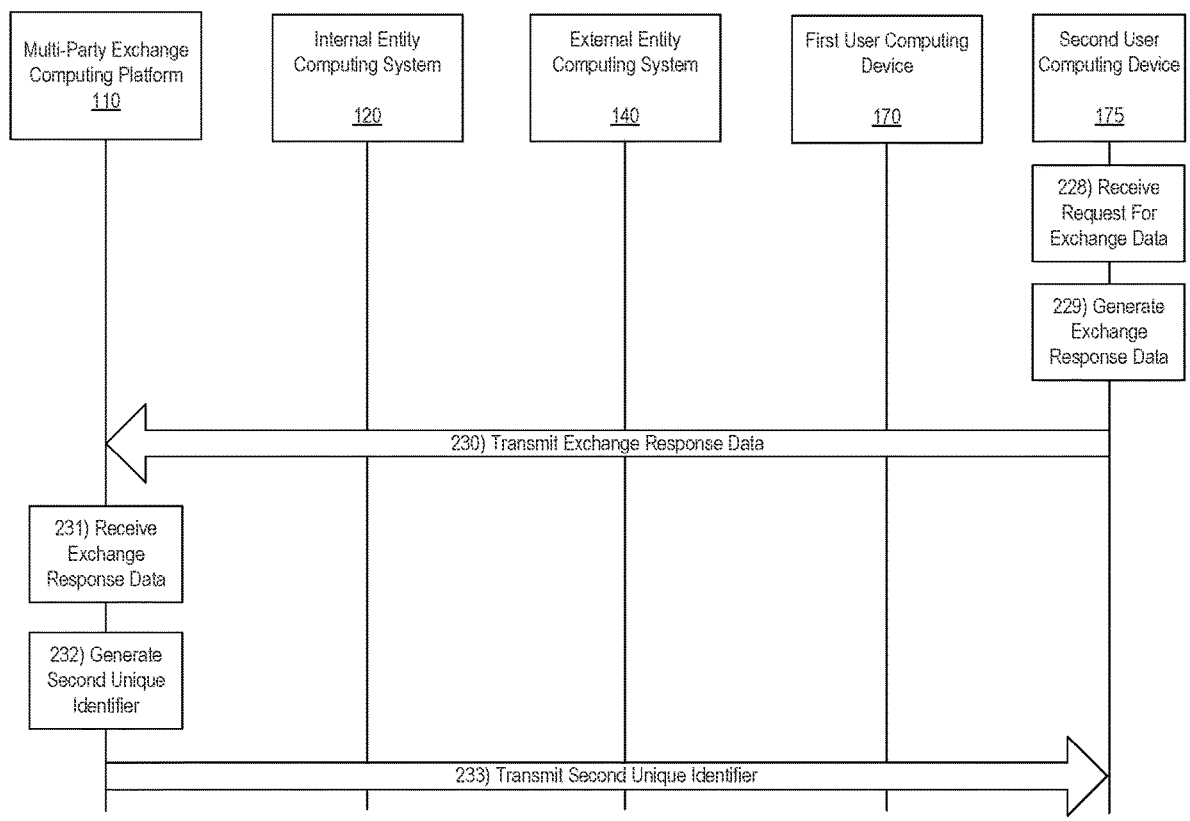

With reference to FIG. 2F, at step 228, the second user computing device 175 may receive the request for additional exchange data. At step 229, exchange response data may be generated. For instance, a user may input (e.g., via one or more interactive user interfaces associated with an application executing on the mobile device) the requested additional exchange data. The second user computing device 175 may then generate the exchange response data based on the user input.

At step 230, the exchange response data may be transmitted by the second user device 175 to the multi-party exchange computing platform 110.

At step 231, the exchange response data may be received by the multi-party exchange computing platform 110.

At step 232, a second unique exchange identifier may be generated. For instance, the multi-party exchange computing platform 110 may generate a second unique exchange identifier based on the received exchange response data. The second unique exchange identifier may include data linking the second user to the property, goods or services being exchanged, the price associated with the property, goods or services, and the like. In some examples, the second unique exchange identifier may be stored by the multi-party exchange computing platform 110 (e.g., via the record generated at step 221).

At step 233, the multi-party exchange computing platform 110 may transmit the second unique exchange identifier to the second user computing device 175.

Figure 2G:
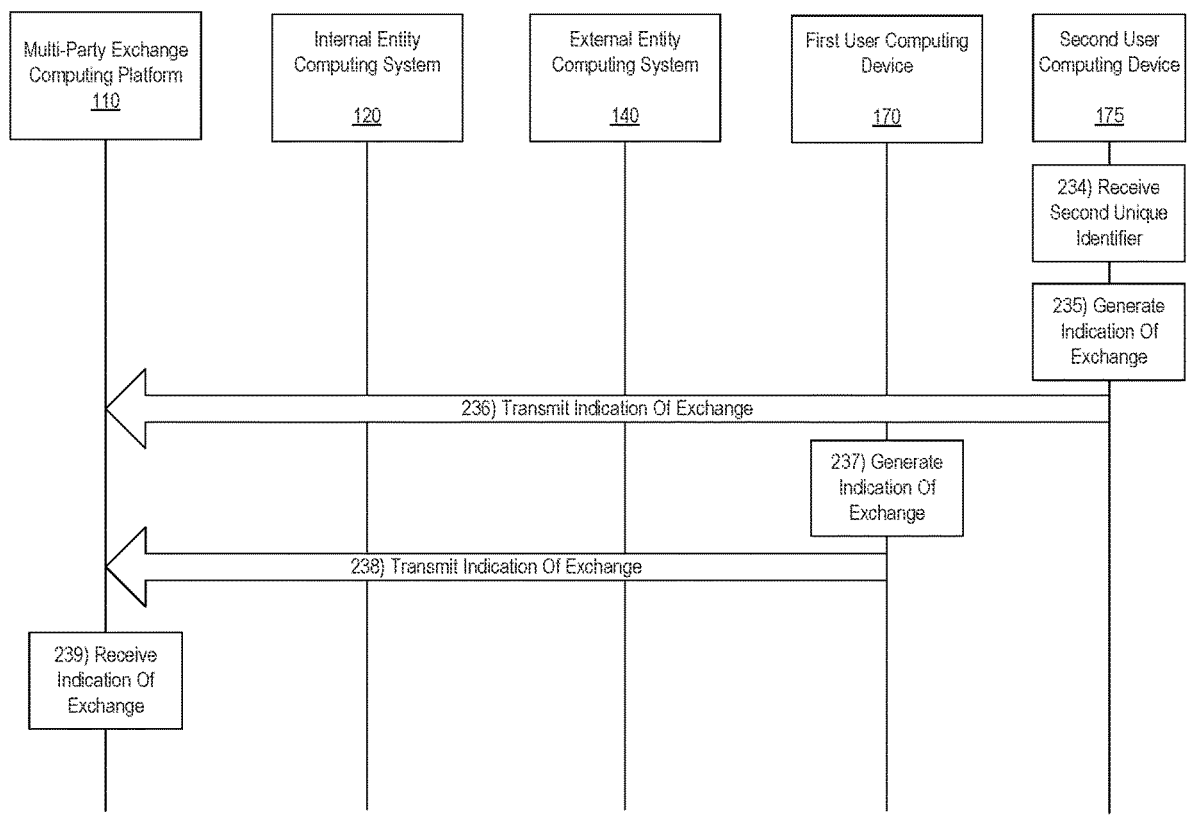

With reference to FIG. 2G, at step 234, the second user computing device 175 may receive the second unique exchange identifier and may store the second unique exchange identifier.

At step 235, the second user computing device 175 may generate an indication of exchange. For instance, each user may agree to or accept terms of the exchange (e.g., agree to exchange of goods, services, or the like, agree to payment of a particular price, or the like). In some examples, agreement or acceptance of the exchange may include selection of an "accept" option on an interactive user interface displayed by an application executing on second user computing device 175.

At step 236, the indication of exchange may be transmitted from the second user computing device 175 to the multi-party exchange computing platform 110.

At step 237, similar to step 235, the first user computing device may generate an indicate of exchange. Similar to the arrangement above, agreement or acceptance of the exchange may include selection of an "accept" option on an interactive user interface displayed by an application executing on first user computing device 170.

At step 238, the indication of exchange may be transmitted from the first user computing device 170 to the multi-party exchange computing platform 110.

At step 239, the indication of exchange may be received by the multi-party exchange computing platform 110. Although an indication of exchange is shown as being received from each of first user computing device 170 and second user computing device 175, in some examples, an indication of exchange from one of first user computing device 170 or second user computing device 175, may be received by multi-party exchange computing platform 110.

Figure 2H:
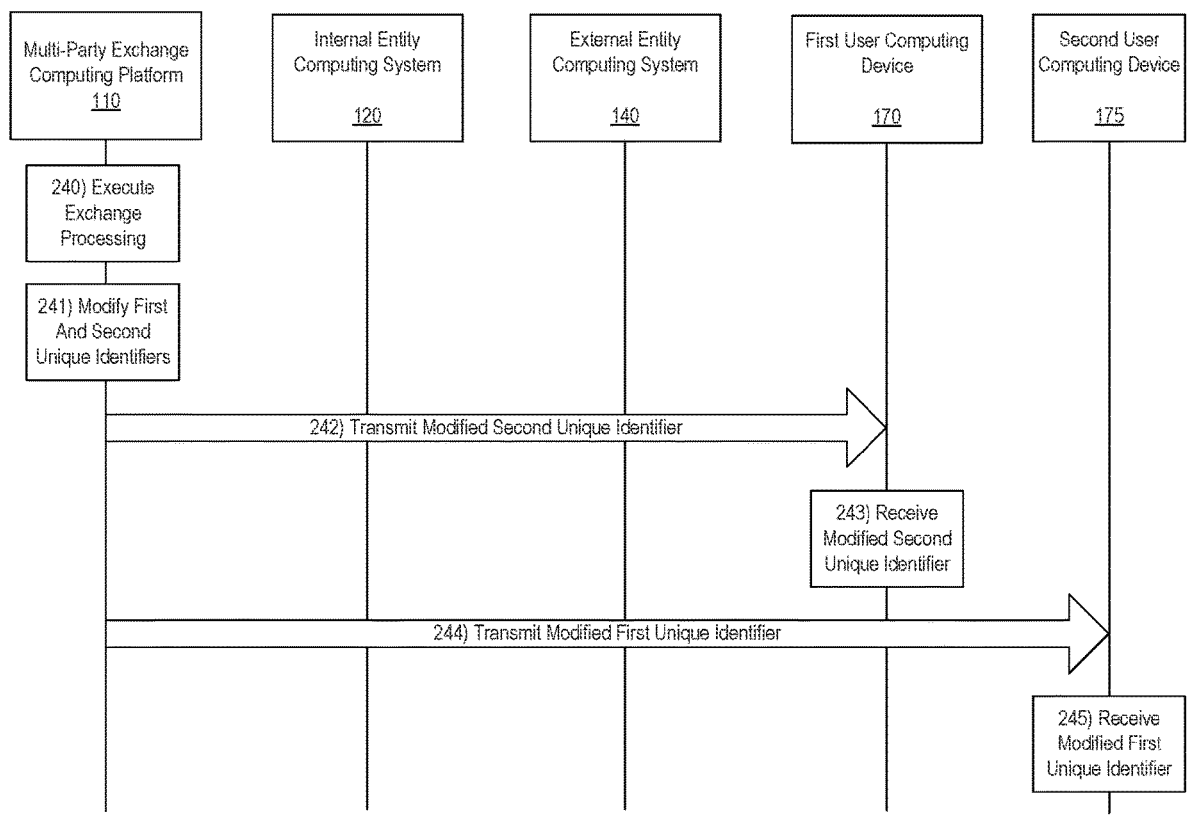

With reference to FIG. 2H, at step 240, the multi-party exchange computing platform 110 may execute one or more exchange processing functions. For instance, amounts associated with the exchange, accounts associated with the exchange, and the like may be identified and data associated with the exchange may be updated.

In some examples, executing one or more exchange processing functions may include authenticating a user, confirming that the user has rights to exchange the goods, property or services, and the like. In some examples, a distributed ledger, such as blockchain, may be used to track ownership of goods, property or services, confirm a user has ownership rights in the goods, property or services being exchanged, and the like. For instance, a blockchain may be generated and a block may be added to the blockchain indicating current ownership of property. Prior to completing an exchange, the multi-party exchange computing platform 110 may confirm that the party has ownership rights in the property. After completing the exchange, a block may be added to the blockchain indicating the new owner of the property.

In some examples, executing one or more exchange processing functions may include an entity implementing the multi-party exchange computing platform 110 taking ownership of goods provided as part of the exchange and for which the entity provided currency. For instance, in arrangements in which a value is determine for goods from a first user and currency is transmitted to the second user on behalf of the first user, the entity may then take ownership of the goods. In some examples, that may include taking physical ownership, receiving a transfer of title, or the like.

At step 241, the first unique exchange identifier and the second unique exchange identifier may be modified to reflect new ownership of goods or services associated with the identifier. For instance, the first unique exchange identifier may be modified to indicate that the goods, services, or the like, or value associated therewith, associated with that identifier are now owned by the second user. Similarly, the second unique exchange identifier may be modified to indicate that the goods, services, or the like, associated with the second unique exchange identifier are now owned by the first user. In some examples, the modified unique exchange identifiers may be stored by the multi-party exchange computing platform 110 (e.g., via the record generated at step 221).

At step 242, the modified second unique exchange identifier may be transmitted to the first user computing device 170. At step 243, the modified second unique exchange identifier may be received by first user computing device 170 and stored.

At step 244, the modified first unique exchange identifier may be transmitted to the second user computing device 175. At step 245, the modified first unique exchange identifier may be received by second user computing device 175 and stored.

Figure 2I:
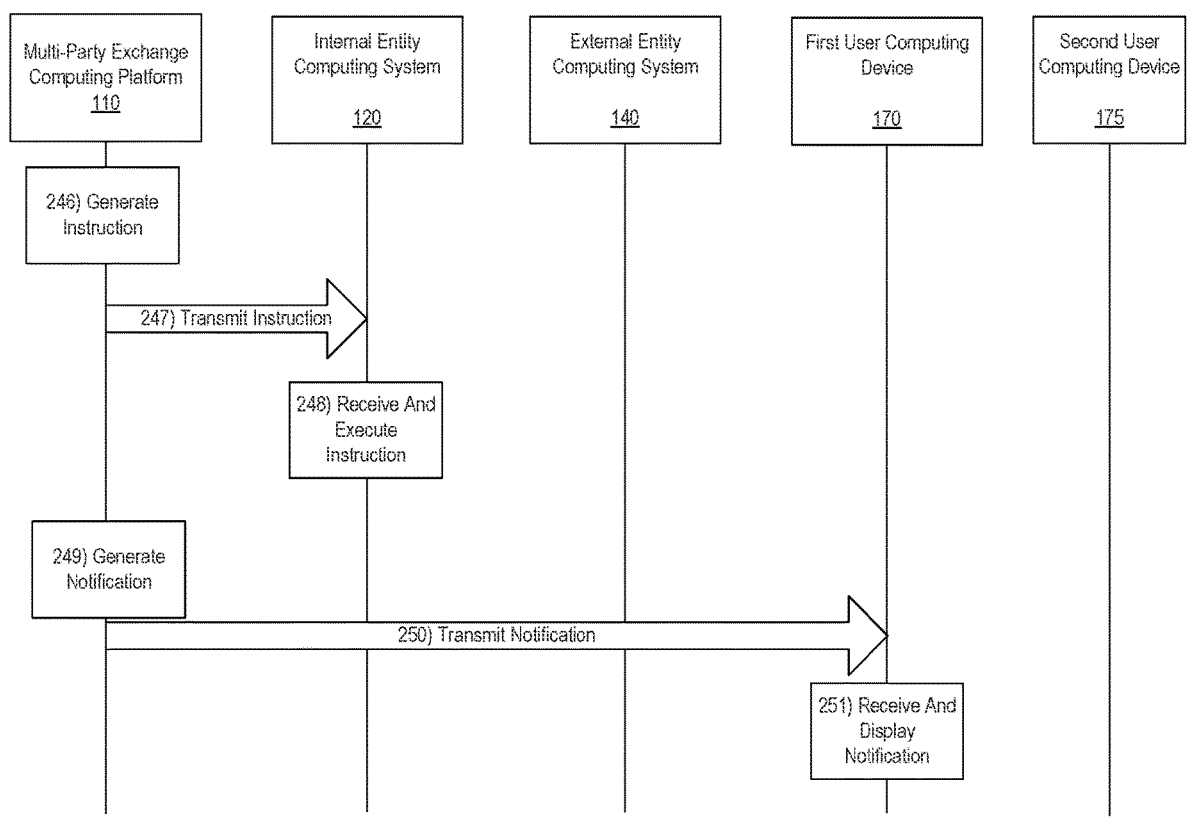

With reference to FIG. 2I, at step 246, an instruction may be generated. In some examples, the instruction may include a command to transfer an amount of funds to a second user as part of the exchange. At step 247, the instruction may be transmitted to the internal entity computing system 120. At step 248, the instruction may be received and executed. For instance, the funds may be transferred, one or more account ledgers may be updated, and the like.

Figure 5:
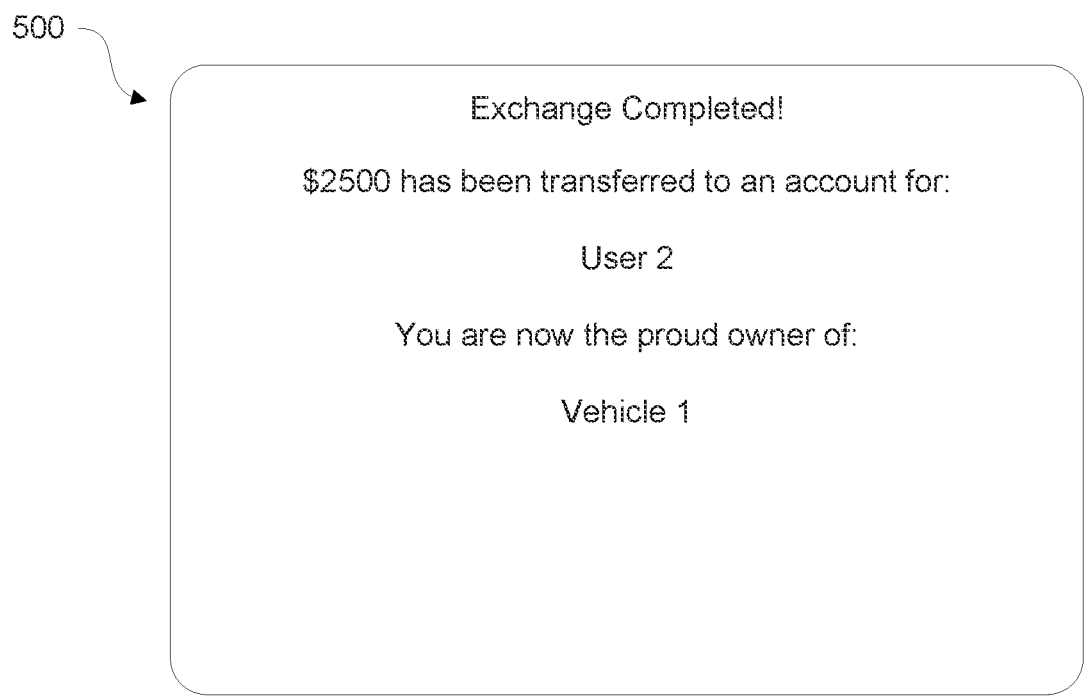
Figure 6:
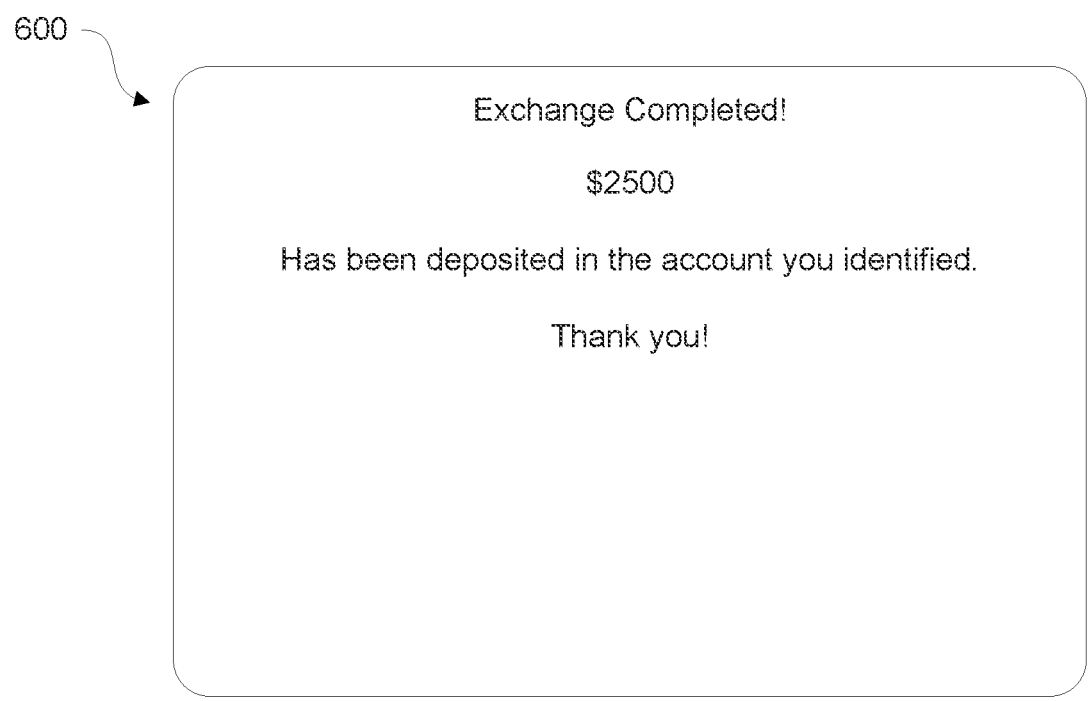

At step 249, one or more notifications indicating completion of the exchange processing may be generated. For instance, FIG. 5 illustrates one example user interface 500 that includes a first generated notification to the first user indicating that the exchange has been completed. FIG. 6 illustrates one example user interface 600 that includes a second generated notification to the second user indicating that the exchange has been completed.

At step 250, the generated first notification may be transmitted to the first user computing device 170 and, at step 251, the first notification may be received by first user computing device 170 and displayed by a display of first user computing device 170.

Figure 2J:
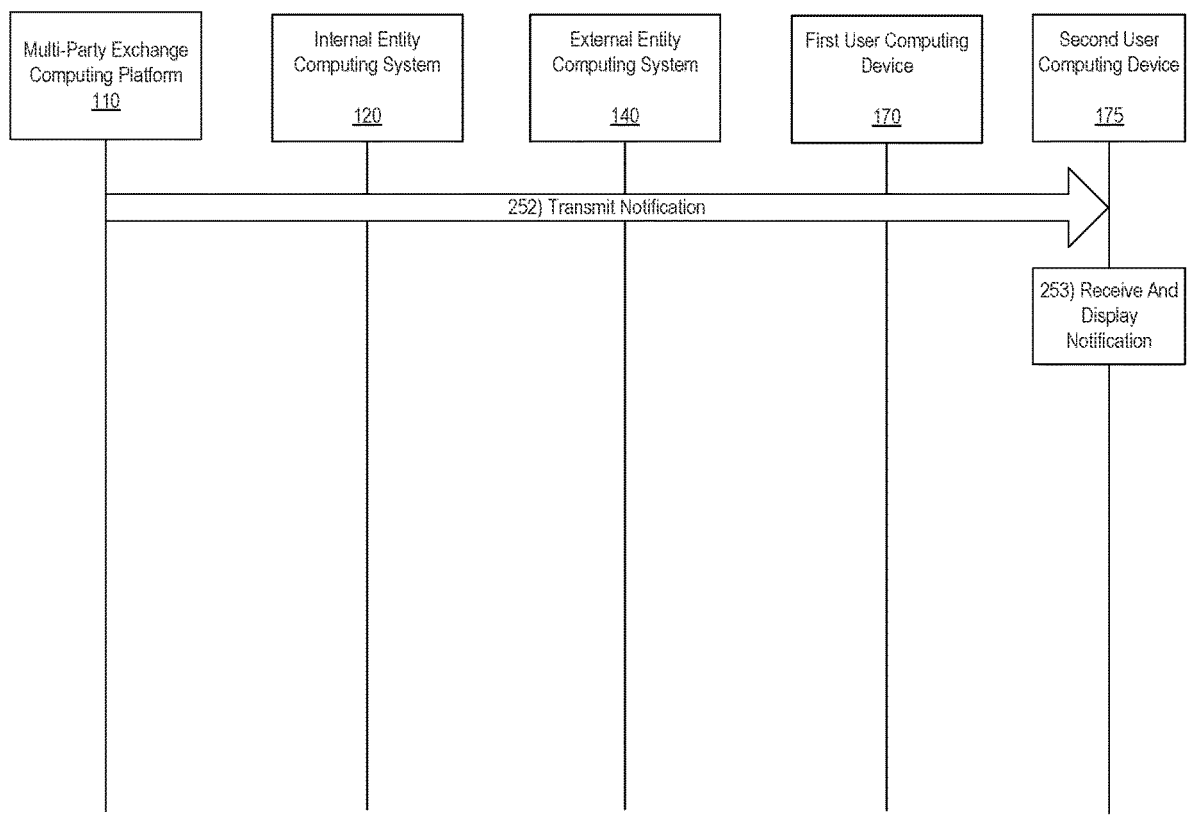

With reference to FIG. 2J, at step 252, the generated second notification may be transmitted to the second user computing device 175 and, at step 253, the second notification may be received by second user computing device 175 and displayed by a display of second user computing device 175.

Figure 3:
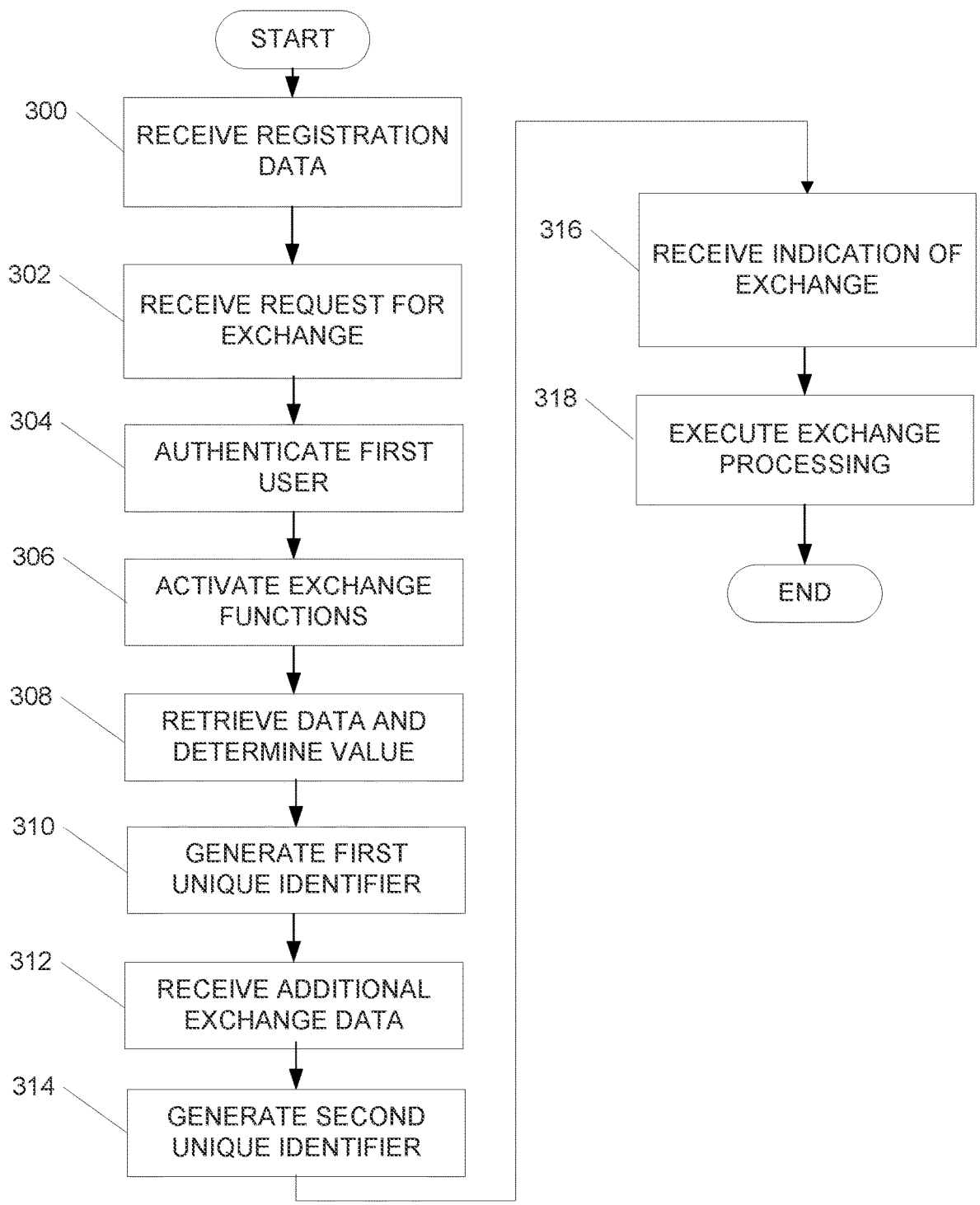
FIG. 3 illustrates an illustrative method for implementing multi-party exchange functions according to one or more aspects described herein.

FIG. 3 is a flow chart illustrating one example method of multi-party exchange functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data may be received. For instance, one or more users may register with the entity or enterprise organization implementing the multi-party exchange computing platform 110. In some examples, registration data may include user identifying data, account data, contact information, user device identifiers, authentication data, and the like. In some examples, a user may initiate exchanges with other registered users and/or may invite additional users to register to facilitate an exchange.

At step 302, a request to initiate an exchange may be received. In some examples, the request to initiate the exchange may include identification of one or more other parties to the exchange, identification of goods, services, property, or the like, associated with the exchange, and the like. In some examples, blockchain may be used to confirm ownership of the property, goods, or services identified as part of the exchange. For instance, the multi-party exchange computing platform 110 may confirm, based on data contained in one or more blocks of the blockchain, that the first user owns the property identified for exchange.

At step 304, in response to receiving the request to initiate the exchange, the multi-party exchange computing platform 110 may authenticate the user requesting the exchange. For instance, the multi-party exchange computing platform 110 may request authentication data from the user and may compare received authentication response data to pre-stored data. If the authentication response data matches pre-stored authentication data, the user may be authenticated and the process may continue. If the data does not match, the process may end.

In some examples, different levels of authentication may be required in order to initiate or process an exchange. For instance, one or more dollar amount thresholds may be established such that, if a value of an exchange is below a threshold, a first level of authentication may be required. If the value of the exchange is above the threshold, a second, different level of authentication may be required. For instance, if a value of an exchange is below a first threshold, the user may be required to input a personal identification number to authenticate. If the value of the exchange is above the first threshold but below a second threshold, biometric data may be required in addition to the personal identification number. If the value of the exchange is above the second threshold, a one-time passcode may be transmitted to a registered user device and may be input in order to authenticate the user. Accordingly, different types or forms of authentication, number of authentication forms, and the like, may be used to authenticate users.

At step 306, one or more exchange functions may be activated or initiated. For instance, in response the user being authenticated, one or more exchange functions that was previous disabled may be enabled or activated.

At step 308, the multi-party exchange computing platform 110 may receive data (e.g., from one or more internal sources and/or one or more external sources) to determine a value associated with the goods, services, property, or the like, being offered by the first user in the exchange. For instance, if the user is proposing to exchange gold coins or use gold coins to purchase property, goods, services, or the like, from a second user, the multi-party exchange computing platform 110 may receive information from one or more sources to determine a current value of the gold coins (e.g., based on a current market value of an ounce of gold). The multi-party exchange computing platform 110 may then represent that an amount of currency equal to the determined value is available for exchange.

At step 310, a first unique exchange identifier may be generated. For instance, a first unique exchange identifier including data linking the identifier to the user requesting the exchange, the determined value, and the like, may be generated. The first unique exchange identifier may be transmitted to a user device associated with the first user and stored.

At step 312, additional exchange data may be requested and received. For instance, a request for additional exchange data may be transmitted to one or more other parties to the exchange. Each user may respond with exchange response data including property, goods, services, or the like, associated with the exchange, and the like. In response to receiving the requested additional exchange data, the multi-party exchange computing platform may confirm, via a blockchain, that the second user has valid ownership of the property identified for exchange.

At step 314, a second unique exchange identifier may be generated. For instance, a second unique exchange identifier may be generated including data linking the second unique exchange identifier to the second or other party to the exchange, goods, services, or the like, included in the exchange, and the like. The second unique exchange identifier may be transmitted to a user device of the second user and stored.

At step 316, an indication of exchange may be received by the multi-party exchange computing platform 110. For instance, each user or party to the exchange may agree to process or accept the exchange. In some examples, agreeing to the exchange may include transmitting unique exchange identifiers between parties. For instance, the first user may transmit the first unique exchange identifier to the second user and vice versa in order to complete the exchange. This exchange of unique exchange identifiers may be communicated to the multi-party exchange computing platform 110 and may trigger exchange processing.

At step 318, exchange processing may be executed. For instance, an amount of funds equal to the value of the goods being provided by the first user (or equal to a purchase price) may be transferred to an account of second user. Additionally or alternatively, the first unique exchange identifier and second unique exchange identifier may be modified to reflect the new ownership of goods, services, or the like, associated with each unique exchange identifier. For instance, the first unique exchange identifier may be modified to reflect that the second user now owns or has received funds equal to an agreed upon price and the modified first unique identifier may be transmitted to the user device associated with the second user. Similarly, the second unique exchange identifier may be modified to reflect that the first user now owns the property, goods, or the like, provided by the second user in the exchange. The modified second unique exchange identifier may be transmitted to the user device associated with the first user. Each modified unique exchange identifier may be stored at its respective device. Accordingly, in a subsequent exchange for the same goods, services, or the like, a user may provide the modified unique exchange identifier (e.g., in requesting to initiate the exchange, in response to a request for additional exchange data, or the like) rather than the multi-party exchange computing platform 110 generating a new unique exchange identifier.

Further, ownership of any goods provided by the first user as value in the exchange may be transferred to an entity implementing the multi-party exchange computing platform 110. For instance, the user may deliver the goods to the entity, may transfer title in the goods, or the like. The entity may then hold the property for future exchange, may sell the goods, or the like.

In some examples, exchange processing may include adding one or more blocks to the blockchain indicating new ownership of the property, goods, services, or the like, exchanged between the parties. Accordingly, if a subsequent exchange is requested, the blockchain may accurately reflect current ownership of the property.

As discussed herein, in some examples, a distributed ledger, such as blockchain, may be used to track exchanges, confirming ownership of property, goods or services, and the like. The blockchain may operate in a decentralized peer-to-peer (P2P) system that may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as verifying ownership of property, tracking exchanges, and the like, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

The term blockchain may refer to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, exchange of property, purchase of goods with cryptocurrency or other non-traditional form of payment, digital content storage and delivery, entity authentication and authorization, digital identity, marketplace creation and operation, internet of things (IoT), prediction platforms, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., exchange of goods, smart contract operations, and the like) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network. Examples of network functions may include "smart contract operations" and/or "multi-party exchanges." A smart contract operation may describe one or more operations performed by a "smart contract," which may be one or more algorithms and/or programs associated with one or more nodes within a decentralized P2P network.

Figure 7:
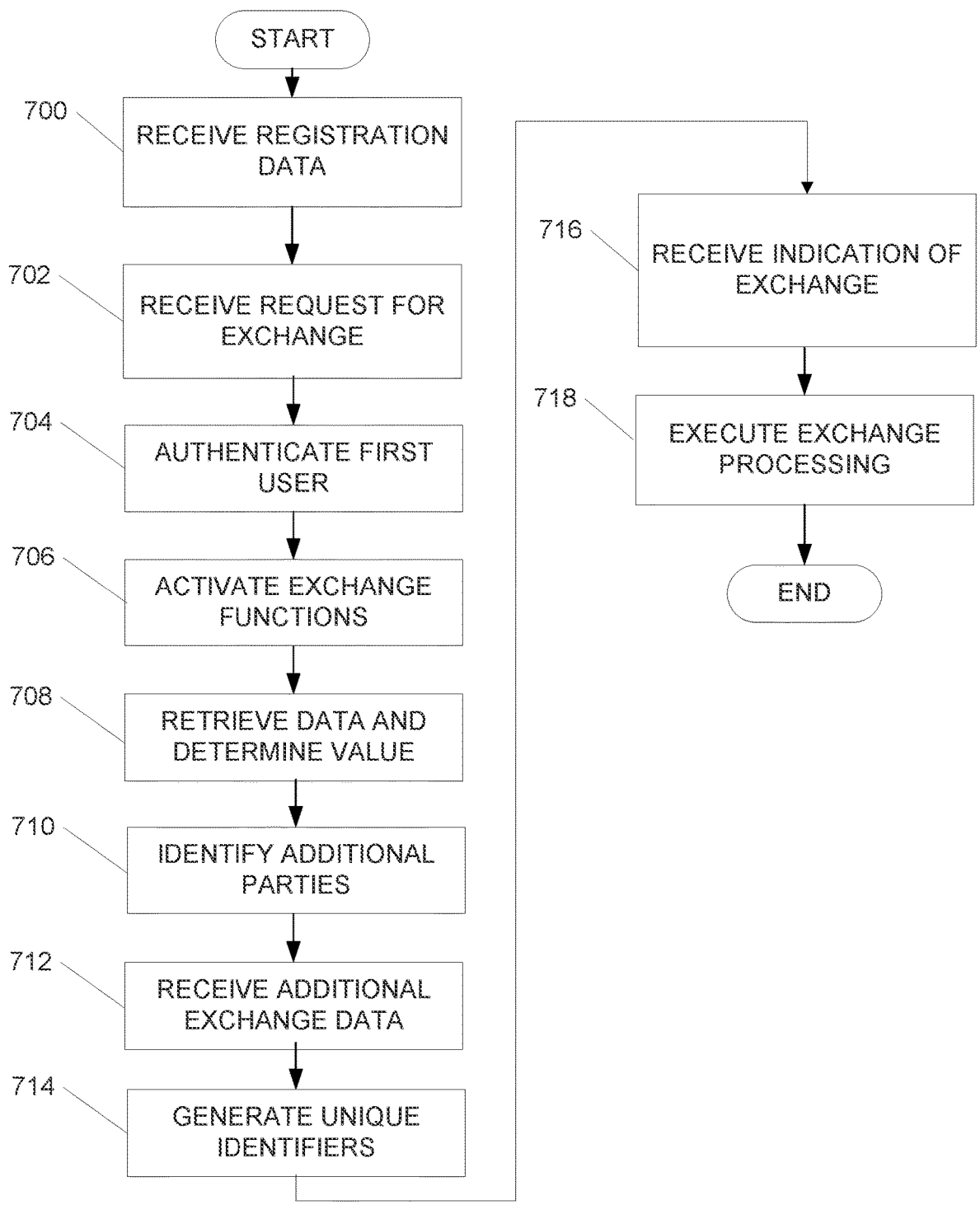
FIG. 7 illustrates another illustrative method for implementing multi-party exchange functions according to one or more aspects described herein.

FIG. 7 is a flow chart illustrating another example method of multi-party exchange functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 7 may be performed in real-time or near real-time.

At step 700, registration data may be received. For instance, one or more users may register with the entity or enterprise organization implementing the multi-party exchange computing platform 110. In some examples, registration data may include user identifying data, account data, contact information, user device identifiers, authentication data, and the like. In some examples, a user may initiate exchanges with other registered users and/or may invite additional users to register to facilitate an exchange. In some examples, receiving registration data may cause download of an application to the user computing device. The application may execute on the user computing device and may be used to request exchange, accept proposed exchanges, and the like.

At step 702, a request to initiate an exchange may be received. In some examples, the request to initiate the exchange may include identification of one or more other parties to the exchange, identification of goods, services, property, or the like, associated with the exchange, and the like. In some examples, blockchain may be used to confirm ownership of the property, goods, or services identified as part of the exchange. For instance, the multi-party exchange computing platform 110 may confirm, based on data contained in one or more blocks of the blockchain, that the first user owns the property identified for exchange.

In some examples, the request for exchange might not include identification of other parties to the exchange. Instead, additional parties may be identified by the multi-party exchange computing platform 110, as well be discussed more fully below.

At step 704, in response to receiving the request to initiate the exchange, the multi-party exchange computing platform 110 may authenticate the user requesting the exchange. For instance, the multi-party exchange computing platform 110 may request authentication data from the user and may compare received authentication response data to pre-stored data. If the authentication response data matches pre-stored authentication data, the user may be authenticated and the process may continue. If the data does not match, the process may end.

Similar to arrangements discussed above, different levels of authentication may be required in order to initiate or process an exchange (e.g., based on type of exchange, amount, or the like).

At step 706, one or more exchange functions may be activated or initiated. For instance, in response the user being authenticated, one or more exchange functions that was previous disabled may be enabled or activated.

At step 708, the multi-party exchange computing platform 110 may receive data (e.g., from one or more internal sources and/or one or more external sources) to determine a value associated with the goods, services, property, or the like, being offered by the first user in the exchange. For instance, if the user is proposing to exchange gold coins or use gold coins to make a purchase, the multi-party exchange computing platform 110 may receive information from one or more sources to determine a current value of the gold coins (e.g., based on a current market value of an ounce of gold).

At step 710, one or more other parties to the exchange may be identified. For instance, a user may request to sell property or may indicate in the request for exchange that they would like to purchase particular goods, property, or the like. In some examples, the multi-party exchange computing platform 110 may identify one or more other parties to facilitate the exchange. For instance, registered users may also be requesting exchanges. Accordingly, the multi-party exchange computing platform 110 may review all active exchange requests and match the requested exchange with one or more other exchanges. For instance, a round robin situation may be identified in which a first user may exchange property 1 for property 3 held by user 3 via one or more intermediary users that may have property to exchange (e.g., property 2 held by user 2). Accordingly, if user 3 is not interested in property 1 in exchange for property 3, the multi-party exchange computing platform 110 may identify other parties to include in the exchange in order to facilitate an exchange acceptable to all parties. Accordingly, in the example above, user 3 might not be interested in property 1 but may be interested in property 2. Accordingly, the computing platform 110 may identify property 2 to include in the exchange such that user 1 may exchange property 1 with user 2, who will then exchange property 2 with user 3, who will then exchange property 3 with user 1.

In some examples, machine learning may be used to identify additional parties to an exchange. For instance, one or more machine learning datasets may be generated using historical exchange data. The machine learning datasets may identify patterns or sequences within the historical data. Accordingly, the machine learning datasets may be used to match or identify additional parties to an exchange. After an exchange is proposed, feedback in the form of acceptance or rejection of the exchange may be received and used to update and/or validate the machine learning datasets. Accordingly, the system may be continuously learning and improving accuracy based on feedback data received.

Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

At step 712, additional exchange data may be requested and received. For instance, a request for additional exchange data may be transmitted to one or more identified other parties to the exchange. Each user may respond with exchange response data including property, goods, services, or the like, associated with the exchange, and the like. In response to receiving the requested additional exchange data, the multi-party exchange computing platform may confirm, via a blockchain, that the second user has valid ownership of the property identified for exchange.

At step 714, a unique exchange identifier may be generated for each party to the exchange. For instance, a unique exchange identifier may be generated including data linking a respective unique exchange identifier to each party to the exchange, goods, services, or the like, included in the exchange, and the like. Each unique exchange identifier may be transmitted to a user device of the respective user and stored.

At step 716, an indication of exchange may be received by the multi-party exchange computing platform 110. For instance, each user or party to the exchange may agree to process or accept the exchange. In some examples, agreeing to the exchange may include transmitting unique exchange identifiers between parties. For instance, the first user may transmit a first unique exchange identifier to the second user who may then transfer a second unique identifier to a third user who may then transfer a third unique identifier to the first user in order to complete the exchange. This exchange of unique exchange identifiers may be communicated to the multi-party exchange computing platform 110 and may trigger exchange processing.

At step 718, exchange processing may be executed. For instance, an amount of funds equal to the value of the goods being provided by the first user (or equal to a purchase price) may be transferred to an account of second user. Additionally or alternatively, the unique exchange identifiers may be modified to reflect the new ownership of goods, services, or the like, associated with each unique exchange identifier. Each modified unique exchange identifier may be transmitted to a user device and stored at its respective device. Accordingly, in a subsequent exchange for the same goods, services, or the like, a user may provide the modified unique exchange identifier (e.g., in requesting to initiate the exchange, in response to a request for additional exchange data, or the like) rather than the multi-party exchange computing platform 110 generating a new unique exchange identifier.

In some examples, exchange processing may include adding one or more blocks to the blockchain indicating new ownership of the property, goods, services, or the like, exchanged between the parties. Accordingly, if a subsequent exchange is requested, the blockchain may accurately reflect current ownership of the property.

Aspects described herein are generally directed to a multi-party exchange system. As discussed herein, the multi-party exchange computing platform may facilitate exchange of goods or services using, for example, non-traditional payment methods.

For example, a first user may desire to purchase a vehicle from a second user. In exchange, the first user would like to use gold coins to make the purchase. The first user may initiate a request for exchange with the multi-party exchange computing platform and may indicate a number, type, or the like, of gold coins for use in the purchase. The multi-party exchange computing platform may determine a current value of the gold coins (e.g., based on current market rate associated with an ounce of gold) and may represent to the second user that funds available in an amount equal to the value of the gold are being held for the first user and are available for use. The multi-party exchange computing platform may request additional exchange data from the second user. For instance, the multi-party exchange computing platform may request the make and model of the vehicle, asking price, and the like. A unique identifier associated with the gold may be generated and linked to the first user and a second unique exchange identifier associated with the vehicle may be generated and linked to the second user.

Upon receiving an indication of acceptance of the exchange, the multi-party exchange computing platform may execute one or more exchange processing functions. For instance, currency or funds may be transferred to an account of the second user as payment for the purchase of the vehicle. Further, the unique identifiers associated with each user may be updated or modified. For instance, the unique identifier of the first user may be modified to reflect ownership of the vehicle, while the unique identifier of the second user may be updated to reflect that the second user no longer owns the vehicle and instead has funds in the agreed to amount.

Aspects described herein may include one or more additional security measures to ensure legitimacy of the exchanges. For instance, ownership of any goods, property or services may be confirmed prior to the exchange. Users the exchange may be required to authenticate (e.g., via the application executing on the user device). As discussed above, types of authentication data, number of authentication factors, and the like, may be determined based on parameters of the exchange (e.g., amount of the exchange, type of property being exchanged, or the like). In some examples, the unique exchange identifiers may act as secure codes to prevent unauthorized exchanges.

In some examples, parties to each exchange may determine or identify one or more parameters associated with the exchange. For instance, each party may agree to a period of time for backing out of the exchange, returning goods, or the like. Accordingly, the entity implementing the multi-party exchange computing platform may hold all currency, property, or the like, for the determined time period and may complete the processing upon expiration of the time period.

While aspects described herein are related to purchase of goods, services may also be purchased via arrangements described herein. For instance, a user having a house cleaning business may offer services in exchange for goods or property of another user. If the other user had no use for the offered house cleaning services, the multi-party exchange computing platform may determine a value associated with the house cleaning services and represent to the second user that the first user has funds available in the amount of the value. The multi-party exchange computing platform may then evaluate other requested exchanges to use the house cleaning services in another exchange.

Further, while many examples describe determining a value and the entity providing currency to the user in the amount of the value, in some examples, the multi-party exchange computing platform may facilitate an exchange of goods for goods, services for services, goods for services, or the like. Accordingly, the multi-party exchange computing platform may determine a value of goods or services and may facilitate the exchange based on the determined value of the items being exchanged by all parties.

Aspects described herein may be used in the purchase of any type of goods, property or services. Further, users may provide various different types of non-traditional payment via the arrangements described herein. For instance, users may use precious metals, company stock, collectibles, cryptocurrency, personal property, real property, and the like, to make exchanges via the arrangements described herein.

In some examples, users may request an exchange but another party might not be immediately available for exchange. Accordingly, the multi-party exchange computing platform may monitor requested exchanges and may notify the user when a willing party is available. Additionally or alternatively, the multi-party exchange computing platform may automatically execute the exchange (e.g., with the user's permission) when an available party is identified.

Figure 8:
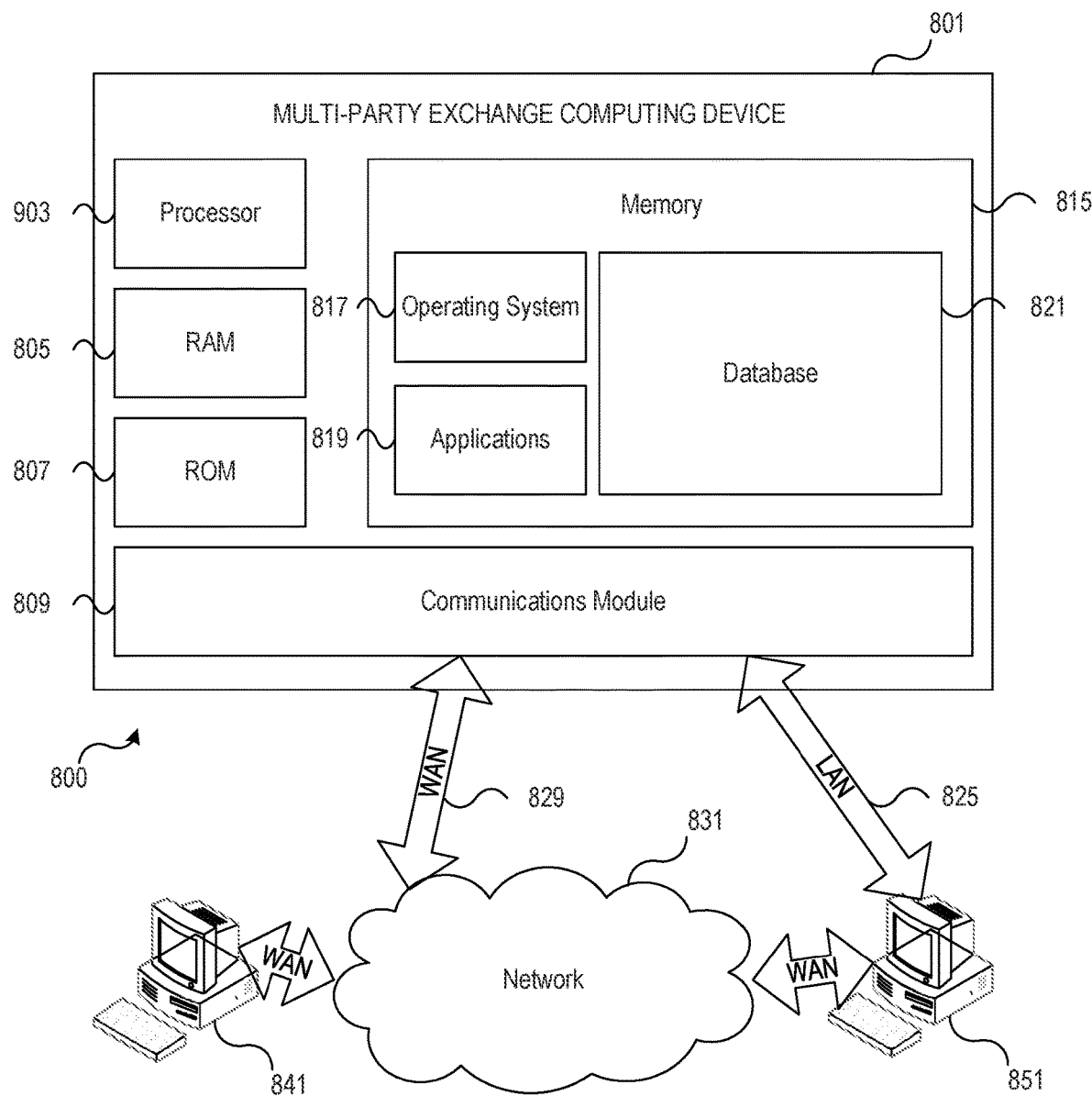
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include multi-party exchange computing device 801 having processor 703 for controlling overall operation of multi-party exchange computing device 801 and its associated components, including Random Access Memory (RAM) 805, Read-Only Memory (ROM) 807, communications module 809, and memory 815. Multi-party exchange computing device 801 may include a variety of computer readable media. Computer readable media may be any available media that may be accessed by multi-party exchange computing device 801, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by multi-party exchange computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on multi-party exchange computing device 801. Such a processor may execute computer-executable instructions stored on a computer-readable medium.

Software may be stored within memory 815 and/or storage to provide instructions to processor 803 for enabling multi-party exchange computing device 801 to perform various functions as discussed herein. For example, memory 815 may store software used by multi-party exchange computing device 801, such as operating system 817, application programs 819, and associated database 821. Also, some or all of the computer executable instructions for multi-party exchange computing device 801 may be embodied in hardware or firmware. Although not shown, RAM 805 may include one or more applications representing the application data stored in RAM 805 while multi-party exchange computing device 801 is on and corresponding software applications (e.g., software tasks) are running on multi-party exchange computing device 801.

Communications module 809 may include a microphone, keypad, touch screen, and/or stylus through which a user of multi-party exchange computing device 801 may provide input, and may also include one or more of a speaker for providing audio output and a video display device for providing textual, audiovisual and/or graphical output. Computing system environment 800 may also include optical scanners (not shown).

Multi-party exchange computing device 801 may operate in a networked environment supporting connections to one or more remote computing devices, such as computing devices 841 and 851. Computing devices 841 and 851 may be personal computing devices or servers that include any or all of the elements described above relative to multi-party exchange computing device 801.

The network connections depicted in FIG. 8 may include Local Area Network (LAN) 825 and Wide Area Network (WAN) 829, as well as other networks. When used in a LAN networking environment, multi-party exchange computing device 801 may be connected to LAN 825 through a network interface or adapter in communications module 809. When used in a WAN networking environment, multi-party exchange computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 9:
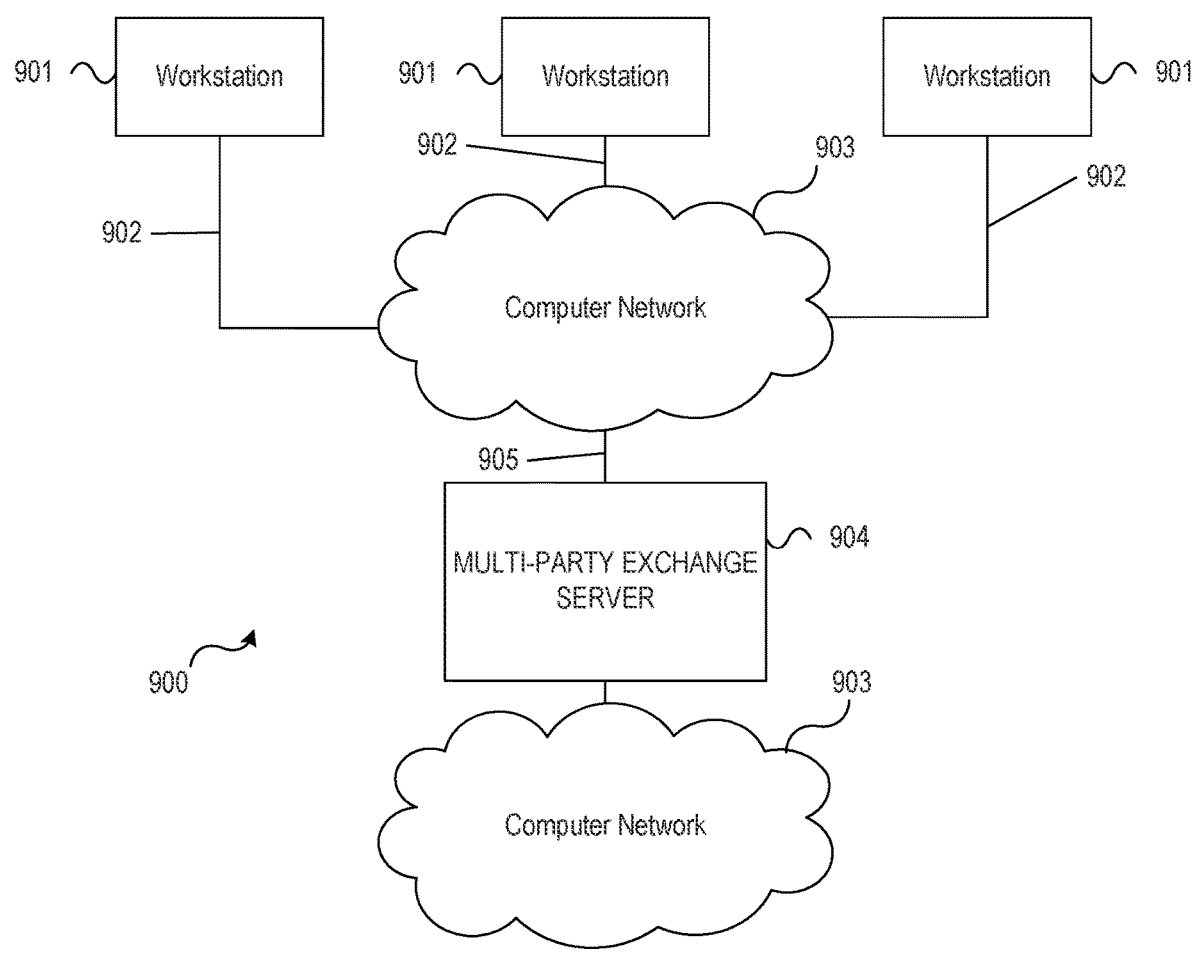
FIG. 9 depicts an illustrative block diagram of workstations and servers that may be used to implement the processes and functions of certain aspects of the present disclosure in accordance with one or more aspects described herein.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like, configured to perform various processes described herein. Workstations 901 may be local or remote, and may be connected by one of communications links 902 to computer network 903 that is linked via communications link 905 to multi-party exchange server 904. In system 900, multi-party exchange server 904 may be a server, processor, computer, or data processing device, or combination of the same, configured to perform the functions and/or processes described herein. Server 904 may be used to receive requests to initiate an exchange, retrieve data, determine a value of property or goods, generate one or more unique exchange identifiers, generate and execute instructions to process an exchange, and the like.

Computer network 903 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 902 and 905 may be communications links suitable for communicating between workstations 901 and multi-party exchange server 904, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
     receive, from a first user computing device of a first user who is a first party to an exchange, a request for the exchange including identification of a second user who is a second party to the exchange;
     identify, based on the request for the exchange, first property for exchange;
     determine a value of the first property;
     generate a first unique exchange identifier, the first unique exchange identifier linking the first user to the first property and the determined value of the first property;
     transmit, to the first user computing device, the first unique exchange identifier;
     transmit, to a second user computing device of the second user, a request for identification of second property for exchange and an amount associated with the second property for exchange;
     receive, from the second user computing device, the identification of the second property for exchange and the amount associated with the second property for exchange;
     generate, a second unique exchange identifier, the second unique exchange identifier linking the second user to the second property and the amount associated with the second property;
     transmit, to the second user computing device, the second unique exchange identifier;
     receive, from at least one of: the first user computing device or the second user computing device, an indication that the exchange has been accepted by the first user and the second user;
     responsive to receiving the indication that the exchange has been accepted, execute an exchange completion process, wherein executing the exchange completion process causes modification of the first unique exchange identifier to link the first unique exchange identifier to the second user and the amount associated with the first property for exchange, and modification of the second unique exchange identifier to link the second unique exchange identifier to the first user and the second property;
     transmit, to the first user computing device, the modified second unique exchange identifier; and
     transmit, to the second user computing device, the modified first unique exchange identifier.

2. The computing platform of claim 1, wherein the indication that the exchange has been accepted includes an indication that the first unique exchange identifier has been transmitted to the second user computing device and the second unique exchange identifier has been transmitted to the first user computing device.

3. The computing platform of claim 1, further including instructions that, when executed, cause the computing platform to:
   store the modified first unique exchange identifier and the modified second unique exchange identifier.

4. The computing platform of claim 1, wherein determining the value of the first property further includes:
   receive, from at least one of: an internal computing system or an external computing system, value data; and
   determining, based on the received value data, a value of the first property.

5. The computing platform of claim 1, further including instructions that, when executed, cause the computing platform to:
   authenticate the first user, wherein authenticating the first user includes requesting authentication data and wherein the requested authentication data is based on one or more parameters of the exchange.

6. The computing platform of claim 5, wherein the requesting authentication data based on the one or more parameters of the exchange includes at least one of: requesting certain types of authentication data based on the one or more parameters of the exchange or requesting a certain number of authentication factors based on the one or more parameters of the exchange.

7. The computing platform of claim 1, wherein executing the exchange completion process includes adding one or more blocks to a blockchain indicating new ownership of the first property and the second property.

8. A method, comprising:
   receiving, by a computing platform, the computing platform having at least one processor and memory and from a first user computing device of a first user who is a first party to an exchange, a request for the exchange including identification of a second user who is a second party to the exchange;
   identify, by the at least one processor and based on the request for the exchange, first property for exchange;
   determining, by the at least one processor, a value of the first property;
   generating, by the at least one processor, a first unique exchange identifier, the first unique exchange identifier linking the first user to the first property and the determined value of the first property;

transmitting, by the at least one processor and to the first user computing device, the first unique exchange identifier;
transmitting, by the at least one processor and to a second user computing device of the second user, a request for identification of second property for exchange and an amount associated with the second property for exchange;
receiving, by the at least one processor and from the second user computing device, the identification of the second property for exchange and the amount associated with the second property for exchange;
generating, by the at least one processor, a second unique exchange identifier, the second unique exchange identifier linking the second user to the second property and the amount associated with the second property;
transmitting, by the at least one processor and to the second user computing device, the second unique exchange identifier;
receiving, by the at least one processor and from at least one of: the first user computing device or the second user computing device, an indication that the exchange has been accepted by the first user and the second user;
responsive to receiving the indication that the exchange has been accepted, executing, by the at least one processor, an exchange completion process, wherein executing the exchange completion process causes modification of the first unique exchange identifier to link the first unique exchange identifier to the second user and the amount associated with the first property for exchange, and modification of the second unique exchange identifier to link the second unique exchange identifier to the first user and the second property;
transmit, to the first user computing device, the modified second unique exchange identifier; and
transmit, to the second user computing device, the modified first unique exchange identifier.

9. The method of claim 8, wherein the indication that the exchange has been accepted includes an indication that the first unique exchange identifier has been transmitted to the second user computing device and the second unique exchange identifier has been transmitted to the first user computing device.

10. The method of claim 8, further including storing the modified first unique exchange identifier and the modified second unique exchange identifier.

11. The method of claim 8, wherein determining the value of the first property further includes:
receiving, by the at least one processor and from at least one of: an internal computing system or an external computing system, value data; and
determining, by the at least one processor and based on the received value data, a value of the first property.

12. The method of claim 8, further including:
authenticating the first user, wherein authenticating the first user includes requesting authentication data and wherein the requested authentication data is based on one or more parameters of the exchange.

13. The method of claim 12, wherein the requesting authentication data based on the one or more parameters of the exchange includes at least one of: requesting certain types of authentication data based on the one or more parameters of the exchange or requesting a certain number of authentication factors based on the one or more parameters of the exchange.

14. The method of claim 8, wherein executing the exchange completion process includes adding one or more blocks to a blockchain indicating new ownership of the first property and the second property.

15. One or more non-transitory computer-readable media storing instructions that, when executed by a computing platform comprising at least one processor, memory, and a communication interface, cause the computing platform to:
receive, from a first user computing device of a first user who is a first party to an exchange, a request for the exchange including identification of a second user who is a second party to the exchange;
identify, based on request for the exchange, first property for exchange;
determine a value of the first property;
generate a first unique exchange identifier, the first unique exchange identifier linking the first user to the first property and the determined value of the first property;
transmit, to the first user computing device, the first unique exchange identifier;
transmit, to a second user computing device of the second user, a request for identification of second property for exchange and an amount associated with the second property for exchange;
receive, from the second user computing device, the identification of the second property for exchange and the amount associated with the second property for exchange;
generate, a second unique exchange identifier, the second unique exchange identifier linking the second user to the second property and the amount associated with the second property;
transmit, to the second user computing device, the second unique exchange identifier;
receive, from at least one of: the first user computing device or the second user computing device, an indication that the exchange has been accepted by the first user and the second user; and
responsive to receiving the indication that the exchange has been accepted, execute an exchange completion process, wherein executing the exchange completion process causes modification of the first unique exchange identifier to link the first unique exchange identifier to the second user and the amount associated with the first property for exchange, and modification of the second unique exchange identifier to link the second unique exchange identifier to the first user and the second property;
transmit, to the first user computing device, the modified second unique exchange identifier; and
transmit, to the second user computing device, the modified first unique exchange identifier.

16. The one or more non-transitory computer-readable media of claim 15, wherein the indication that the exchange has been accepted includes an indication that the first unique exchange identifier has been transmitted to the second user computing device and the second unique exchange identifier has been transmitted to the first user computing device.

17. The one or more non-transitory computer-readable media of claim 15, further including instructions that, when executed, cause the computing platform to:
store the modified first unique exchange identifier and the modified second unique exchange identifier.

18. The one or more non-transitory computer-readable media of claim 15, wherein determining the value of the first property further includes:
receiving, from at least one of: an internal computing system or an external computing system, value data; and determining, based on the received value data, a value of the first property.

19. The one or more non-transitory computer-readable media of claim 15, further including instructions that, when executed, cause the computing platform to:
authenticate the first user, wherein authenticating the first user includes requesting authentication data and wherein the requested authentication data is based on one or more parameters of the exchange.

20. The one or more non-transitory computer-readable media of claim 19, wherein the requesting authentication data based on the one or more parameters of the exchange includes at least one of: requesting certain types of authentication data based on the one or more parameters of the exchange or requesting a certain number of authentication factors based on the one or more parameters of the exchange.

\* \* \* \* \*